(12) United States Patent
Suzuki et al.

(10) Patent No.: US 6,891,793 B1
(45) Date of Patent: May 10, 2005

(54) NETWORK SYSTEM

(75) Inventors: Hiroyuki Suzuki, Kawasaki (JP); Junji Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/409,146

(22) Filed: Sep. 30, 1999

(30) Foreign Application Priority Data

Jan. 20, 1999 (JP) .......................................... 11-011488

(51) Int. Cl.⁷ .......................................... H04L 12/28
(52) U.S. Cl. .................. 370/217; 370/225; 370/236; 370/289; 709/242; 714/2
(58) Field of Search ................ 370/225, 236, 370/242, 289, 216–218, 227, 236.2, 248, 244–245, 254, 389, 539; 709/242; 714/2, 4

(56) References Cited

U.S. PATENT DOCUMENTS 6,034,961 A * 3/2000 Masuo et al. ............... 370/219
6,347,073 B1 * 2/2002 Hiscock et al. ............. 370/217
6,411,599 B1 * 6/2002 Blanc et al. ................. 370/219

\* cited by examiner

*Primary Examiner*—Dang Ton
*Assistant Examiner*—Inder Pal Mehra
(74) *Attorney, Agent, or Firm*—Katten Muchin Zavis Rosenman

(57) ABSTRACT

When an edge node whose order is lower than that of a primary switch detects a failure of the primary switch, the edge node requests a secondary switch that the secondary switch serves as a host of the edge node itself. At this time, the secondary switch establishes a connection between the secondary switch and the edge node, generates routing information and label information in a core network which does not comprise the primary switch to give the routing information and the label information to the edge node. The secondary switch performs communication between the edge node and the secondary switch by using the routing information and the label information which are received from the secondary switch.

11 Claims, 16 Drawing Sheets

NETWORK SYSTEM

BACKGROUND OF THE INVENTION

1. Field of the Invention

The present invention relates to a network system constituted by a plurality of low-order networks and a high-order network in which the plurality of low-order networks is accommodated.

2. Prior Art

In recent years, popularization of the Internet advances, and users of the Internet sharply increase in number. In this state, the performance of backbone networks of the Internet is required to be improved. As one backbone networks which can realize high performance, a label switching system using an MPLS (Multi Protocol Label Switching) technique is known.

FIG. 17 is a diagram showing a network system using a label switching system. As shown in FIG. 17, the network system is constituted by a core network for realizing the label switching system and a plurality of local area networks (LANs) connected to the core network through routers.

The core network is constituted by a plurality of label switches connected to each other through a communication circuit and a single edge node or a plurality of edge nodes connected to the label switches through the communication circuit. Each of the edge nodes is connected to the LAN through routers.

Each of the label switches acquires routing information (communication route information) in the core network according to known routing protocol such as OSPF (Open Shortest Path First) or BGP4 (Border Gateway Protocol Version 4). Each of the label switches generates information of a path identifier (called a "label") corresponding to the acquired routing information, and transmits the routing information and the label information to an edge node whose order is lower than the corresponding label switch itself according to label distribution protocol (LDP).

Each of the edge nodes receives the routing information and the label information from the high-order label switch according to the LDP. At this time, each of the edge nodes generates and holds a look-up table in which the routing information is related to the label information.

Thereafter, when each of the edge nodes receives data from a router, the edge node refers to the look-up table, reads a label corresponding to a communication route (transfer route) corresponding to the destination of the data from the look-up table to add the label to the data, and transmits the resultant data to a high-order label switch. When each of the label switches receives data from an edge node or another label switch, the label switch determines an output-path of the data by only referring to a label added to the data, and transmits the data from the determined output-path. When each of the edge nodes receives the data from the label switch, the edge node removes the label added to the data, and transfers the data to a router which should receive the data.

In this manner, in the network system using the label switching system, the label switch of the core network determines the output-path of the data with reference to only the label. For this reason, the core network can repeat data at a high speed.

In a network system using a conventional label switching system, the following problem is posed. If a failure is caused in any label switch in the core network shown in FIG. 17, other label switches acquire routing information representing that the label switch having the failure is bypathed by using OSPF or BGP4, generates label information corresponding to the routing, and gives the new routing information and the label information to an edge node whose order is lower than the label switch. The low-order edge node performs data transmission on the basis of the new routing information and the label information received from the label switch. In this manner, service down of traffic passing through the label switch in which the failure is caused can be prevented.

However, with the process described above, the label switch in which the failure is caused is disconnected from the core network. For this reason, the edge node whose order is lower than that of the label switch cannot communicate with other edge nodes.

SUMMARY OF THE INVENTION

It is an object of the present invention to provide a network system in which, even if a label switch is disconnected from a network due to a failure of the label switch, by using an edge node whose order is lower than that of the label switch, communication between the edge node and another edge node can be performed.

The present invention employs the following configuration to achieve the above object.

More specifically, the first aspect of the present invention provides a network system, constituted by a high-order node network including a plurality of high-order nodes and a plurality of low-order nodes connected to one of the plurality of high-order nodes, in which data transmitted from each of the low-order nodes is transferred to another low-order node through the high-order node network. The high-order node network comprises a first low-order node and a second high-order node. The plurality of low-order nodes comprise a first low-order node as a low-order node of the first high-order node. The first low-order node comprises: a detection section detecting a communication failure between the first low-order node and the first high-order node; a host change request section requesting the second high-order node that the second high-order node serves as a high-order node of the first low-order node in place of the first high-order node when the detection section detects the communication failure; and a low-order node setting section performing at least one of process for causing the first low-order node to transmit data to the second high-order node in place of the first high-order node on the basis of the process information transmitted from the second high-order node. The second high-order node comprises: a high-order node setting section performing at least one of process for causing the second high-order node to transmit data received from the first low-order node to another low-order node corresponding to a destination of the data according to the request of the host change request section; and a process information transmission section transmitting process information corresponding to the process performed by the high-order node setting section to the first low-order node.

Here, a high-order node is, e.g., a label switch, and a low-order node is, e.g., an edge node.

The second aspect of the present invention provides a network system, constituted by a high-order node network comprising a plurality of high-order nodes and a plurality of low-order nodes connected to one of the plurality of high-order nodes, in which data transmitted from each of the low-order nodes is transmitted to another low-order node through the high-order node network. The high-order node network comprises a first high-order node and a second high-order node. The plurality of low-order nodes comprise a first low-order node serving as a low-order node of the first high-order node. The first high-order node comprises; a detection section detecting a communication failure between the first high-order node and the first low-order node; a host change request section requesting the second high-order node that the second high-order node serves as a high-order node of the first low-order node in place of the first high-order node when the detection section detects the communication failure. The second high-order node comprises: a high-order node setting section performing at least one of process for causing the second high-order node to transmit data received from the first low-order node to another low-order node corresponding to a destination of the data according to the request of the host change request section; and a process information transmission section transmitting process information corresponding to the process performed by the high-order node setting section to the first low-order node. The first low-order node comprises a low-order node setting section performing at least one of process for causing the first low-order node to transmit data to the second high-order node in place of the first high-order node on the basis of the process information transmitted from the process information transmission section.

According to the first and second aspects, when a failure between the first high-order node and the first low-order node (for example, on a communication circuit for connecting the first high-order node and the second low-order node) is detected, the high-order node of the first low-order node is switched from the first high-order node to the second high-order node. For this reason, the first low-order node (edge node) is prevented from being disconnected from the high-order node network, and communication with another low-order node (edge node) is prevented from being disabled.

The third aspect of the present invention provides a network system, constituted by a high-order node network comprising a plurality of high-order nodes, a plurality of low-order nodes connected to one of the plurality of high-order nodes, and a high-order computer monitoring at least one of the plurality of high-order nodes, in which each of the low-order nodes transmits data to another low-order node through the high-order node network. The high-order node network comprises a first high-order node and a second high-order node. The plurality of low-order nodes comprise a first low-order node serving as a low-order node of the first high-order node. The high-order computer comprises: a detection section detecting a failure of the first high-order node; and a host change request section requesting the second first high-order node that the second high-order node serves as a high-order node of the first low-order node in place of the first high-order node when the detection section detects the failure. The second high-order node comprises: a high-order node setting section performing at least one of process for causing the second high-order node to transmit data received from the first low-order node to another low-order node corresponding to a destination of the data according to the request of the host change request section; and a process information transmission section transmitting process information corresponding to the process performed by the high-order node setting section to the first low-order node. The first low-order node comprises a low-order node setting section performing at least one of process for causing the first low-order node to transmit data to the second high-order node in place of the first high-order node on the basis of the process information transmitted by the process information transmission section.

According to the third aspect, when a failure of the first high-order node (label switch) is detected by the high-order computer, a high-order node of the first low-order node is switched from the first high-order node to the second high-order node. For this reason, the first low-order node (edge node) is prevented from being disconnected from the high-order node network, and communication with another low-order node is prevented from being disabled.

DETAILED DESCRIPTION OF THE PREFERRED EMBODIMENTS

Figure 1:
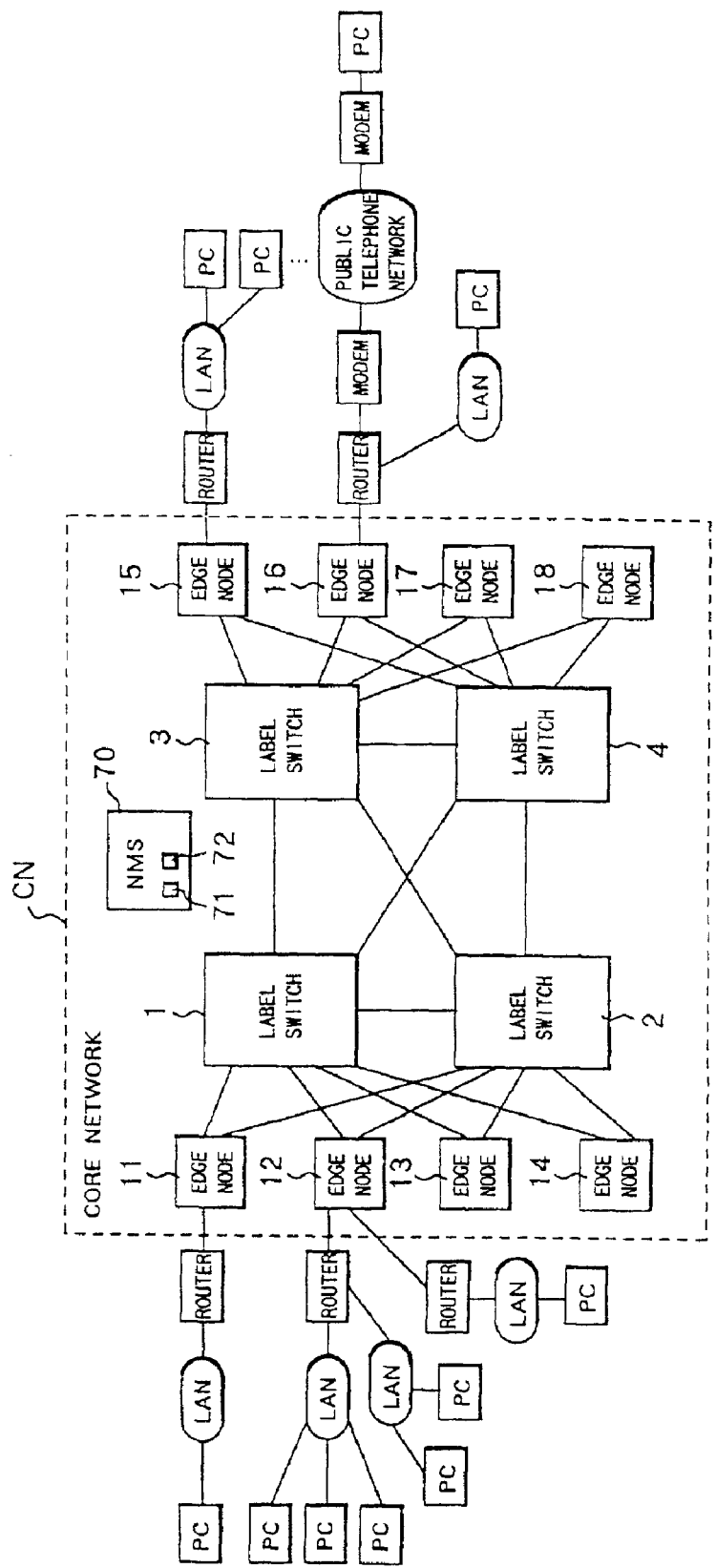
FIG. 1 is a diagram of the configuration of a network system according to Embodiment 1.

Embodiments of the present invention will be described below with reference to the accompanying drawings.
[Embodiment 1]
Configuration of Network System FIG. 1 is a diagram of the configuration of a network system according to Embodiment 1. In FIG. 1, the network system has a core network CN. The core network CN includes a label switching system using MPLS technique. The core network CN is constituted by a plurality of label switches 1 to 4, and a plurality of edge nodes 11 to 18. In this embodiment, the label switches 1 to 4 are constituted by ATM switching systems, and the edge nodes 11 to 18 are constituted by routers. The core network CN is managed according to simple network management protocol (SNMP).

The core network CN has a network management station (NMS) 70 as high-order computer for monitoring and managing the label switches 1 to 4. The NMS 70 is connected to the label switches 1 to 4 through data communication channels (DCC: not shown). The NMS 70 is constituted by, e.g., a work station or a personal computer, and has a detection section 71 and a host change request section 72.

The label switches 1 to 4 are connected to each other through a communication circuit. The edge nodes 11 to 18 are connected to, of the label switches 1 to 4, two label switches whose order nodes are higher than those of the edge nodes themselves through physical circuits (optical fibers). Of the two label switches, one is set as a primary switch, and the other is set as a secondary switch.

Figure 2:
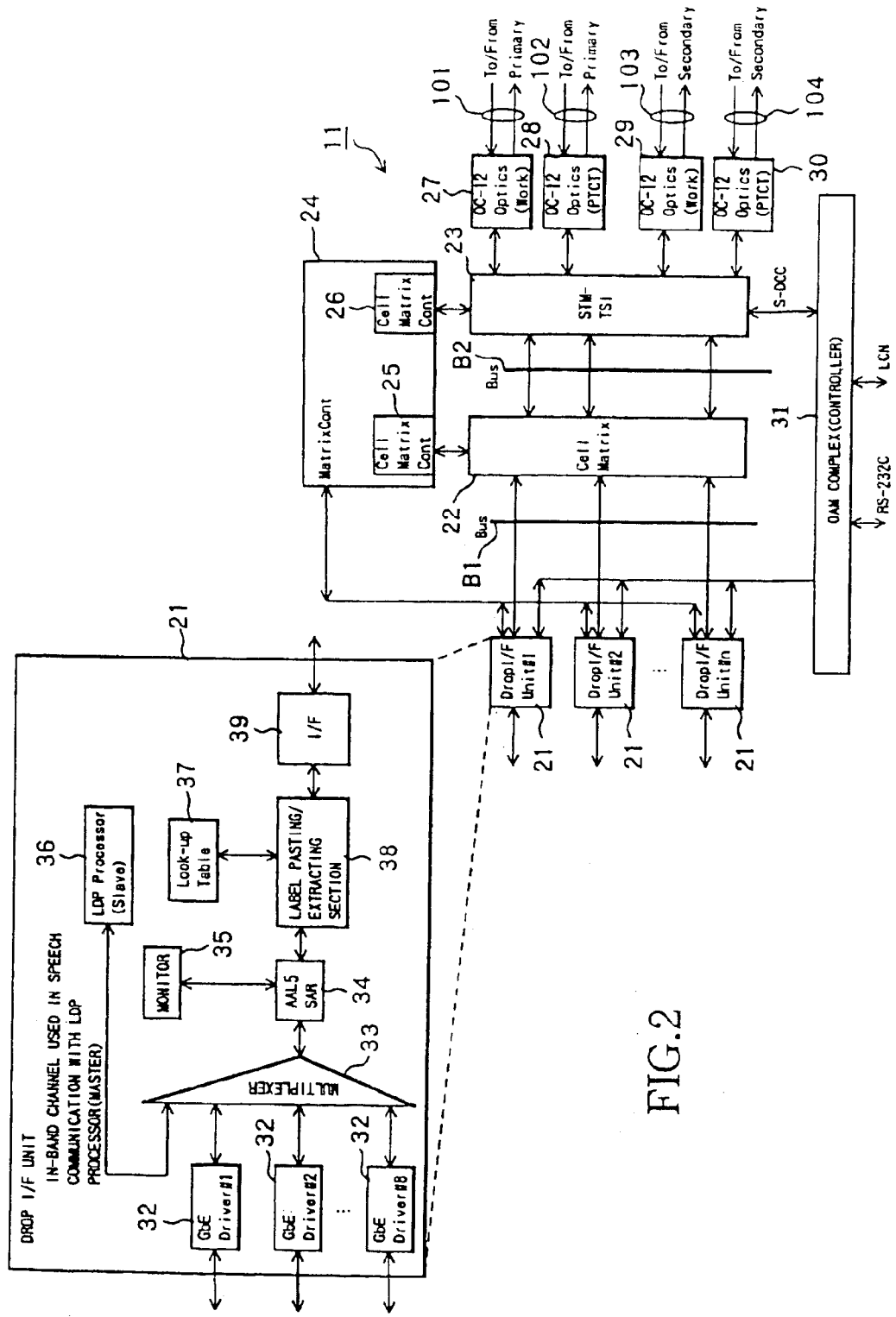
FIG. 2 is a diagram of the configuration of a label switch shown in FIG. 1.

For example, the edge node 11 is connected to the label switch 1 serving as a primary switch and the label switch 2 serving as a secondary switch through optical fibers 101 to 104 (see FIG. 2). The edge node 12 is connected to the label switch 2 serving as a primary switch and the label switch 1 serving as a secondary switch through optical fibers. The edge nodes 11 to 18 are connected to the primary switches and the secondary switches in point-to-point (P-to-P).

Each of the edge nodes 11 to 18, like the edge node 11 or the edge node 12, accommodates a single router or a plurality of routers. Each router accommodates a single LAN and a plurality of LANs. As described above, the LANs are connected to the core network CN through the routers. Each router is connected to a terminal (PC) through a modem and a telephone circuit (public telephone network). Each LAN accommodates a plurality of terminals (PCs). Each terminal is constituted by a personal computer, a work station, a server machine, or the like.

Each LAN transmits an IP packet according to communication protocol such as TCP/IP to perform data communication between terminals. A terminal connected to a router through a telephone circuit transmits a PPP packet (IP/PPP packet) based on communication protocol such as TCP/IP or PPP (Point to Point Protocol) to the router. When each router receives an IP packet (including a PPP packet), the router transmits an IP packet to another LAN or an edge node according to a destination address of the IP packet.

The label switches 1 to 4 correspond to high-order nodes of the present invention, the network constituted by only the label switches 1 to 4 corresponds to a high-order node network of the present invention, and the edge nodes 11 to 18 correspond to low-order nodes of the present invention. The label switch 1 corresponds to a first high-order node of the present invention, the label switch 2 corresponds to a second high-order node of the present invention, and the edge node 11 corresponds to a first low-order node of the present invention.

Configuration of Edge Node

FIG. 2 is a diagram of the configuration of each of the edge nodes 11 to 18 shown in FIG. 1. Since the edge nodes 11 to 18 have the identical configurations, the edge node 11 will be described as an example. As shown in FIG. 2, the edge node 11 has a plurality of drop interface units (DIUs) 21, a cell matrix 22, an STMTSI (Synchronous Transfer Mode Time Slot Interface) 23, interfaces (OS/OR) 27 to 30, and a matrix controller 24.

Each of the DIUs 21 has a plurality of driver sections 32 connected to routers whose order nodes are lower than that of the DIU itself through an IP circuit, a multiplexer 33 connected to the driver sections 32, a SAR unit (Segmentation and Reassembly unit) 34 connected to the multiplexer 33, a label pasting/extracting section 38 connected to the SAR unit 34, an interface 39 connected to the label pasting/extracting section 38, and a look-up table 37 to which the label pasting/extracting section 38 refers.

The interface 39 is connected to the cell matrix 22 through a bus B1. The interface 39 is connected to the matrix controller 24 and a controller 31. Each of the DIUs 21 has an LDP processor (slave) 36. The LDP processor 36 is connected to the multiplexer 33 and the look-up table 37.

The cell matrix 22 is connected to the matrix controller 24 and connected to the STMTSI 23 through a bus B2. The STMTSI 23 is connected to the matrix controller 24, the interfaces 27 to 30, and the controller 31.

The interface 27 accommodates an optical fiber 101 for connecting the edge node 11 and the primary switch (label switch 1) of the edge node 11. The interface 28 accommodates an optical fiber 102 for connecting the edge node 11 to the label switch 1. The optical fiber 101 constitutes a working line in a so-called duplex line, and the optical fiber 102 constitutes a protection line corresponding to the optical fiber 101.

The interface 29 accommodates an optical fiber 103 for connecting the edge node 11 to the secondary switch (label switch 2) of the edge node 11. The interface 30 accommodates an optical fiber 104 for connecting the edge node 11 to the label switch 2. The optical fiber 103 serves as a working line, and the optical fiber 104 serves as a protection line corresponding to the optical fiber 103.

On each of the optical fibers 101 to 104, an STM circuit (SONET circuit) serving as a logical connection is set. When a failure in the label switch 1 does not occur, the SONET circuits are set on only the optical fibers 101 and 102. A failure in the label switch 1 occurs, the SONET circuits are set on the optical fibers 103 and 104. In FIG. 2, for example, each of the interfaces 27 to 30 has an interface speed defined by OC-12 (Optical Carrier-Level 12) of the SONET (Synchronous Optical Network).

When data is transmitted along a direction (upward direction) extending from the edge node to the label switch, the following process is performed by the edge node 11. More specifically, the driver section 32 of each of the DIUs 21 receives an IP packet (including PPP packet) in which data is stored from a router.

When each of the driver sections 32 receives the IP packet from the router, the driver section 32 refers to the address of the data link layer (layer 2) of the IP packet. Only when it is understood by the result of address referring of each IP packet by the driver section 32 that the IP packet should be transmitted in the upward direction, the IP packet is transmitted to the multiplexer 33.

When the multiplexer 33 receives a plurality of IP packets from the driver sections 32, the multiplexer 33 multiplexes the IP packets. The multiplexed IP packet (multiplexed packet) is transmitted to the SAR unit 34.

When the SAR unit 34 receives the multiplexed packet from the multiplexer 33. At this time, the SAR unit 34 divides the multiplexed packet according to protocol of an ATM adaptation layer (AAL). The divided multiplexed packets are mapped on the payloads of cells of AAL type 5 (capsulation), and transmitted to the label pasting/extracting section 38.

The label pasting/extracting section 38 receives cells from the SAR unit 34. At this time, the label pasting/extracting section 38 refers to the look-up table 37. The look-up table 37 stores label information. The label information is the information of a path identifier corresponding to routing information (communication route information) in the core network CN.

The label pasting/extracting section 38 calculates routing information corresponding to the destination of the IP packet from the source address and the destination address of the IP packet stored in a cell, and reads label information corresponding to the routing information from the look-up table 37 to map the label information on the header of the cell. Thereafter, the cell is transmitted to the interface 39.

When the interface 39 receives the cell from the label pasting/extracting section 38, the interface 39 transmits the cell to the cell matrix 22 and the matrix controller 24.

When the cell matrix 22 receives cells from the DIUs 21, the cell matrix 22 performs switching of the cells according to a control instruction from the matrix controller 24. In this manner, the cells are transmitted from output-paths corresponding to the label information to be given to the STMTSI 23 through the bus B2.

When the STMTSI 23 receives the cells from cell matrix 22, the STMTSI 23 maps the cells on an STM frame (SONET frame) according to a control instruction from the matrix controller 24. Thereafter, the SONET frame is transmitted to an interface corresponding to primary/secondary mode setting.

More specifically, when the set mode is a selection mode for a primary switch (label switch 1), the STMTSI 23 transmits the SONET frame to the interfaces 27 and 28. In contrast to this, when the set mode is a selection mode for a secondary switch (label switch 2), the STMTSI 23 transmits the SONET frame to the interfaces 29 and 30.

When each of the interfaces 27 to 30 receives an SONET frame from the STMTSI 23, the interface converts the electric signal of the SONET frame into an optical signal. The SONET frame converted into the optical signal is transmitted to a label switch through an STM circuit.

On the other hand, when data is transmitted along a direction (downward direction) extending from a label switch to an edge node, the following process is performed in the edge node 11. More specifically, the interfaces 27 and 28 or the interfaces 29 and 30 receive SONET frames. The interface which receives the SONET frame light/electricity-converts the SONET frame to give the converted SONET frame to the STMTSI 23.

When the STMTSI 23 receives the SONET frame from an interface, the STMTSI 23 extracts a plurality of cells from the SONET frame of a working line. Each cell is transmitted to the cell matrix 22. On the other hand, the STMTSI 23 discards the SONET frame of a protection line.

When the cell matrix 22 receives cells from the STMTSI 23 through the bus B2, the cell matrix 22 performs switching of the cells according to a control instruction from the matrix controller 24. In this manner, the cell is transmitted from an output-path corresponding to the label to be input to the DIU 21 corresponding to the label.

In the DIU 21 to which the cell is input, the following process is performed. That is, the interface 39 gives the input cell to the label pasting/extracting section 38. When the label pasting/extracting section 38 receives the cell from the interface 39, the label pasting/extracting section 38 removes a label from the cell. The cell from which the label is removed is transmitted to the SAR unit 34. When the SAR unit 34 receives a plurality of cells from the label pasting/extracting section 38, the SAR unit 34 assembles (encapsulation) an IP packet by the plurality of cells according to AAL protocol. The assembled IP packet is transmitted to the multiplexer 33.

When the multiplexer 33 receives the IP packet from the SAR unit 34, the multiplexer 33 transmits the IP packet to the driver sections 32 or the LDP processor 36 corresponding to the destination of the IP packet. When each of the driver sections 32 receives the IP packet from the multiplexer 33, the driver section 32 refers to the address of the data link layer (layer 2) of the IP packet. Only when the packet should be transmitted in the upward direction, the driver sections 32 transmit the IP packet to a router or a modem. Thereafter, the IP packet is transmitted to a LAN or a telephone circuit (public telephone network), and finally received by a terminal at a target place.

When the data is transmitted along an upward direction or a downward direction, the matrix controller 24 controls the cell matrix 22 and the STMTSI 23. For this reason, the matrix controller 24 has a cell matrix controller 25 for controlling switching performed by the cell matrix 22 and an STM matrix controller 26 for controlling mapping performed by the STMTSI 23.

The matrix controller 24 detects a cell transmitted from each of the DIUs 21 and a cell transmitted from the STMTSI 23. The cell matrix controller 25 gives a control instruction depending on the label of the detected cell to the cell matrix 22. In this manner, a switching operation of the cell matrix 22 is controlled.

The STM matrix controller 26 gives a control instruction based on the label of the cell transmitted from each of the DIUs 21 to the STMTSI 23. In this manner, a mapping operation of the STMTSI 23 is controlled. The matrix controller 24 detects a cell to monitor the number of cells in the edge node 11, and controls traffic on the basis of the monitoring result.

Each time the configuration of the core network CN is changed, the edge node 11 receives label information depending on the change from a high-order label switch. More specifically, when communication failure between the edge node 11 and a primary switch (label switch 1) does not occur, the edge node 11 receives the label information from the primary switch. After the communication between the edge node 11 and the primary switch, the edge node 11 receives label information from a secondary switch (label switch 2).

The received label information is given to the LDP processor 36 according to LDP (Label Distribution Protocol) through the STMTSI 23, the cell matrix 22, the interface 39, the label pasting/extracting section 38, the SAR unit 34, and the multiplexer 33. When the LDP processor 36 receives the label information, the LDP processor 36 updates the look-up table 37 on the basis of the label information.

When the edge node 11 monitors a line for connecting the edge node 11 to the label switch 1, and the edge node 11 detects a failure of the line, a high-order label switch is switched from the primary switch to the secondary switch. For this reason, the edge node 11 has the following configuration. That is, a monitor section 35 as shown in FIG. 2 monitors a process performed by the SAR unit 34. In this manner, the circuit of an ATM layer and the circuit of an IP (PPP) layer are monitored. The monitor section 35 outputs a failure occurrence notice when the monitor section 35 detects a failure of the circuit of each layer. The failure occurrence notice is given to the controller 31 through the SAR unit 34, the label pasting/extracting section 38, and the interface 19. The monitor section 35 monitors a synchronous error of the cell. When the monitor section 35 detects the synchronous error, the monitor section 35 notifies the controller 31 that the synchronous error is detected.

The monitor section 35 monitors the operation of the label pasting/extracting section 38, so that the circuits of the control ATM layer and the IP layer may be monitored. In addition, the controller 31 monitors the operation of the SAR unit 34 and the label pasting/extracting section 38, the circuits of the ATM layer or the IP layer may be monitored.

On the other hand, the LDP processor 36 receives a failure message that a failure of a circuit occurs from the controller through the interface 19, the label pasting/extracting section 38, the SAR unit 34, and the multiplexer 33. At this time, the LDP processor 36 generates a host request message according to the failure message to transmit the host request message to the multiplexer 33. The host request message requests the secondary switch to operate as a high-order switch (host), and requests the LDP processor 36 to receives new label information depending on a change of hosts from the secondary switch. The host request message is transmitted to the secondary switch.

The controller 31 is connected to the interfaces 27 and 28 to monitor the interfaces 27 and 28. In this manner, the controller 31 monitors SONET circuit (circuit of an STM layer). When the controller 31 detects a failure of the working line stored in each of the interfaces 27 and 29, the controller 31 gives a circuit switching instruction to the STMTSI 23. The STMTSI 23 switches a current circuit from the working line to a protection line.

When the controller 31 detects a failure of two SONET circuits (working line and protection line) for connecting the edge node 11 to the label switch 1, or when the controller 31 receives a failure occurrence notice from the monitor section 35, the controller 31 performs control to switch the label switch from the primary switch to the secondary switch. An operation of switching from the primary switch to the secondary switch will be described later.

The controller 31 and the monitor section 35 correspond to the detection section of the present invention, the LDP processor 36 and the controller 31 correspond to the host change request section of the present invention, and the controller 31 corresponds to the low-order node setting section of the present invention. The look-up table 37 corresponds to the memory section of the present invention, and the LDP processor 36 corresponds to the updating section of the present invention.

Configuration of Label Switch

Figure 3:
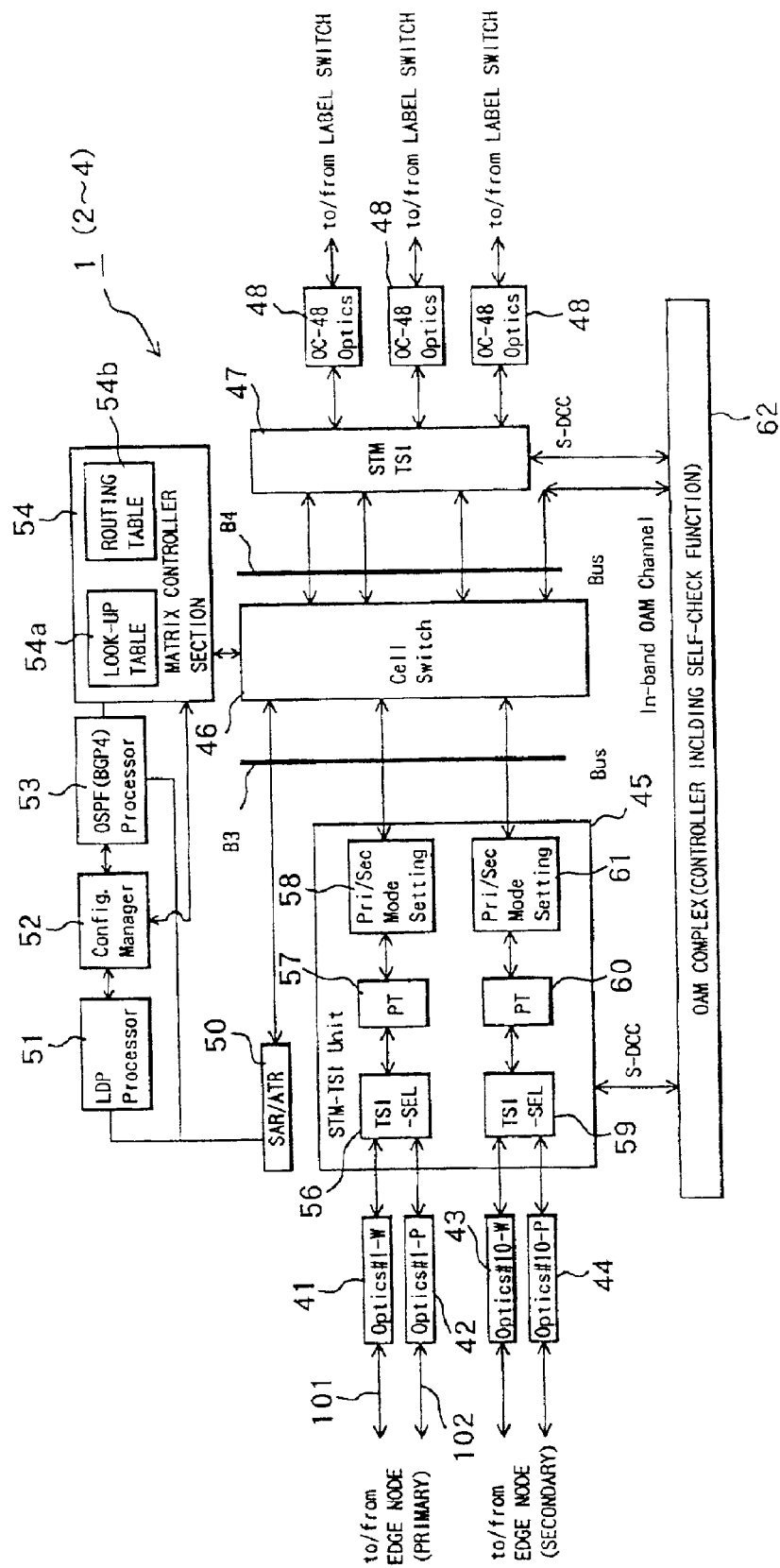
FIG. 3 is a diagram of the configuration of a label switch shown in FIG. 1.

FIG. 3 is a functional block diagram of each of the label switches 1 to 4 shown in FIG. 1. Since the label switches 1 to 4 have the identical configurations, FIG. 3 shows the label switch 1 as an example. As shown in FIG. 3, the label switch 1 has interfaces 41 to 44, an STMTSI unit 45, a cell switch 46, an STMTSI 47, and a plurality of interfaces 48. The interfaces 48 are connected to the other label switches 2 to 4 through an SONET circuit.

The interface 41 accommodates the optical fiber 101 (working line) connected to the edge node 11. The interface 42 accommodates the optical fiber 102 (protection line) connected to the edge node 11.

The interface 43 accommodates an optical fiber (working line) of an edge node to which the label switch 1 is allocated as a secondary switch. The interface 44 accommodates an optical fiber (protection line) of an edge node to which the label switch 1 is allocated as a secondary switch. In this example, the interface 43 accommodates the working line of the edge node 12, and the interface 44 accommodates the protection line of the edge node 12.

The STMTSI unit 45 has a TSI selector 56 connected to the interfaces 41 and 42, a path termination (PT) 57 connected to the TSI selector 56, a main/sub mode setting section (to be referred to as a "mode setting section" hereinafter) 58 connected to the PT 57, a TSI selector 59 connected to the interfaces 43 and 44, a PT 60 connected to the TSI selector 59, and the mode setting section 61 connected to the PT 60.

The interfaces 41 and 42, the TSI selector 56, the PT 57, and the mode setting section 58 are used when no failure occurs in communication between the label switch 1 and the edge node 11. The interfaces 43 and 44, the TSI selector 59, the PT 60, and the mode setting section 61 are used when a failure occurs in communication between the label switch 2 and the edge node 12.

The cell switch 46 is connected to the mode setting sections 58 and 61 of the STMTSI unit 45 through a bus B3. The STMTSI 47 is connected to the cell switch 46 through a bus B4. Each of the interfaces 48 is connected to the STMTSI 47. The interfaces 48 are connected to the other label switches 2 to 4 through an STM circuit. Each of the interfaces 48 has an interface speed defined by OC-48 of SONET.

The label switch 1 has an SAR/ATR section 50 connected to the cell switch 46, an LDP processor (master) 51 connected to the SAR/ATR section 50, an OSPF (BGP4) processor 53 connected to the SAR/ATR section 50, a configuration manager 52 connected to the LDP processor 51 and the OSPF processor 53, and a matrix controller 54 connected to the OSPF processor and the configuration manager 52 and connected to the cell switch 46. In addition, the label switch 1 has a controller (OAM compressor) 62 connected to the STMTSI unit 45 and the STMTSI 47 and connected to the cell switch 46 through the bus B4.

When the label switch 1 receives data from the edge node 11, i.e., when data is transmitted along the upward direction, the following process is performed in the label switch 1. It is presumed that no failure occurs in communication between the label switch 1 and the edge node 11.

More specifically, each of the interfaces 41 and 42 receives a SONET frame transmitted from the edge node 11. Each of the interfaces 41 and 42 converts the SONET frame from optic signal to electric signal and gives the converted SONET frame to the TSI selector 56.

The TSI selector 56 gives the SONET frame received from the each of the interfaces 41 and 42 to the PT 57 depending on at the present setting. More specifically, when no failure occurs in the optical fiber 101, the SONET frame received from the interface 41 is given to the PT 57. On the other hand, when a failure occurs in the optical fiber 102, the SONET frame received from the interface 42 to the PT 57.

The PT 57 extracts a plurality of cells from the SONET frame received from the TSI selector 56 to give the cells to the mode setting section 58. The mode setting section 58 sets a primary/secondary mode according to a control instruction from the controller 62, and performs an operation depending on this setting. When the mode is set to be the primary mode, the mode setting section 58 gives the cells received from the PT 57 to the cell switch 46 or the SAR/ATR section 50 through the bus B3. When the mode setting section 58 receives an OAM cell, the mode setting section 58 notifies the controller 62 of the contents of the OAM cell.

The interfaces 43 and 44, the TSI selector 59, the PT 60, and the mode setting section 61 perform the same operations as those of the interfaces 41 and 42, the TSI selector 56, the PT 57, and the mode setting section 58 when a failure occurs in communication between the label switch 2 and the edge node 12 and when data is transmitted from the edge node 12 to the label switch 1.

When the cell switch 46 receives a cell, the cell switch 46 gives label information stored in the cell to the matrix controller 54. When the matrix controller 54 receives the label information, the matrix controller 54 refers to a look-up table 54a. The look-up table 54a holds the label information and information of an output-path corresponding to the label information.

The matrix controller 54 reads output-path information corresponding to the label information from the look-up table 54a, and gives the out-route information to the cell switch 46 as a control instruction. At this time, the cell switch 46 transmits cells from an output-path depending on the output-path information. In this manner, the cell switch 46 transmits the cells from an output-path corresponding to the label. The cells transmitted from the cell switch 46 are input to the STMTSI 47 through the bus B4.

When the STMTSI 47 receives the cells through the bus B4, the STMTSI 47 maps the cells on an SONET frame depending on the destination of the cells, and gives the SONET frame to the interface 48 depending on the destination. When each of the interfaces 48 receives the SONET frame from the STMTSI 47, the interface 48 light/electricity-converts the SONET frame to transmit the converted SONET frame.

The SONET frames transmitted from the interfaces 48 are transmitted to the other label switches 2 to 4. Each of the interfaces 48 has an interface speed depending on OC-48. Thereafter, the data of the cells stored in the SONET frames transmitted from the interfaces 48 are transmitted to edge nodes corresponding to the labels through routes depending on the labels pasted on the cells, and are transmitted to any one of the terminals as destination node through the low-order network of the edge nodes.

On the other hand, when the label switch 1 receives data from other label switches 2 to 4, i.e., when the data are transmitted along a downward direction, the following process is performed in the label switch 1. It is presumed that no failure occurs in communication between the label switch 1 and the edge node 11.

When the interfaces 48 receive SONET frames transmitted from the other label switches 2 to 4, the interfaces 48 light/electricity-convert the SONET frames to give the converted SONET frames to the STMTSI 47. When the STMTSI 47 receives the SONET frames from the interfaces 48, the STMTSI 47 extracts a plurality of cells from the SONET frames to give the cells to the cell switch 46 through the bus B4.

The cell switch 46 performs switching of the cells according to a control instruction from the matrix controller 54. In this manner, the cells are transmitted from out-routes depending on the labels to be input to the SAR/ATR section 50, the mode setting section 58, or the mode setting section 61. When each of the mode setting sections 58 and 61 receives the cells, and a current mode is set to be a primary mode, the cells are given to the PT 57 or the PT 60. When the mode is set to be a secondary mode, the cells are discarded. Here, the mode setting section 58 transfers the cells to the PT 57, and the mode setting section 61 discards the cells.

When the PT 57 receives the cells from the mode setting section 58, the PT 57 maps the cells on an SONET frame, and gives the generated SONET frame to the TSI selector 56. The TSI selector 56 copies the SONET frame received from the PT 57 to give the SONET frame to the interfaces 41 and 42. Each of the interfaces 41 and 42 converts the SONET frame from electric signal to optic signal and transmits the converted SONET frame to the edge node 11.

When the mode setting section 61 sets a primary mode, the mode setting section 61, the PT 60, the TSI selector 59 and the interfaces 43 and 44 perform the same processes as those of the mode setting section 58, the PT 57, the TSI selector 56, and the interfaces 41 and 42.

Each of the label switches 1 to 4 generates routing information in the core network CN according to OSPF serving as routing protocol, and generates label information depending on the generated routing information. For this reason, each of the label switches 1 to 4 has the following configuration.

More specifically, the configuration manager 52 is periodically/irregularly started. When the configuration manager 52 is started, the configuration manager 52 gives a start instruction to the OSPF processor 53. When the OSPF processor 53 receives the start instruction from the configuration manager 52, the OSPF processor 53 exchange boundary (adjacent) node information with the other label switches 2 to 4 according to the OSPF. The OSPF processor 53 generates routing information in the core network CN by using corrected boundary node information.

In this example, it is assumed that the label switches 1 to 4 belong to the same AS (Autonomous System: operation area of OSPF). In contrast to this, when the label switches 1 to 4 extend over a plurality of ASs, the OSPF processor 53 of each of the label switches 1 to 4 uses BGP4 as routing protocol to generate routing information.

When the OSPF processor 53 generates new routing information, the OSPF processor 53 updates the look-up table 54a on the basis of the routing information. Subsequently, the OSPF processor 53 notifies the configuration manager 52 that the look-up table 54a is updated.

At this time, the configuration manager 52 generates label information corresponding to the routing information stored in the look-up table 54a, and updates the look-up table 54a on the basis of the generated label information. Subsequently, the configuration manager 52 gives the contents (the updated routing information and the updated label information) of the look-up table 54a and a routing table 54b to the LDP processor 51.

When the LDP processor 51 receives the routing information and the label information, the LDP processor 51 transmits the routing information and the label information to a low-order edge node according to the LDP protocol. When the routing information and the label information are received by the edge node, the routing information and the label information are given to the LDP processor 36 (see FIG. 2) of each of the DIUs 21. The LDP processor 36 updates the look-up table 37 on the basis of the routing information and the label information.

As described above, in the core network CN, the label switches 1 to 4 generate the routing information and the label information, and the edge nodes 11 to 18 receive the routing information and the label information from the label switches whose order nodes are higher than those of the edge nodes. Between the label switches, cell switching is performed by only referring to the labels.

The look-up table 54a and the routing table 54b may be held by the configuration manager 52 in place of the matrix controller 54.

The controller 62 corresponds to the high-order node setting section, the process information transmission section, the detection section, the host change request section, and the path information transmission section of the present invention.

Operation in Occurrence of Network Failure

An operation performed when a failure occurs in communication between a label switch set to be a primary switch and an edge node whose order is lower than that of the label switch in the core network CN described above. As an example, an operation performed when a failure occurs in communication between the edge node 11 and the label switch 1 set to be a primary switch of the edge node 11 will be described below with reference to FIGS. 2 to 6.

Figure 4:
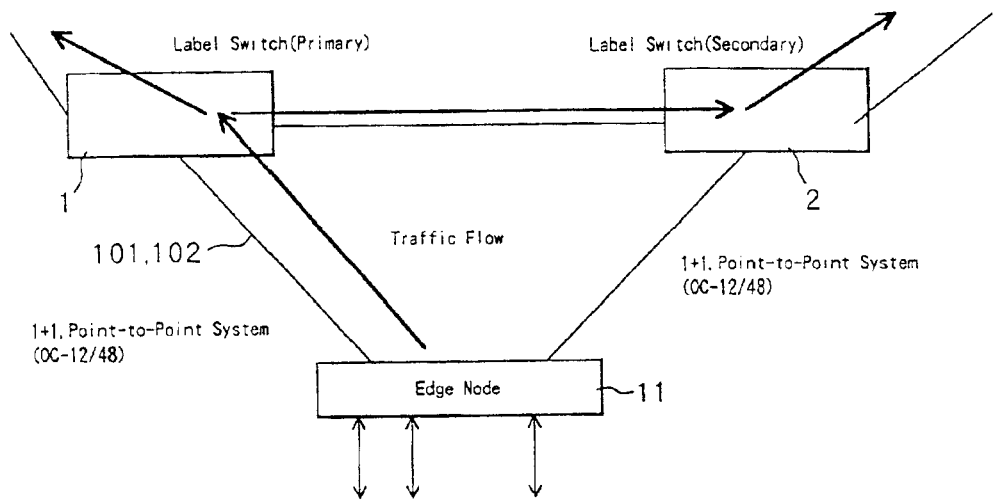
FIG. 4 is a diagram showing traffic when communication between the edge node shown in FIG. 1 and a primary switch is normal.
Figure 5:
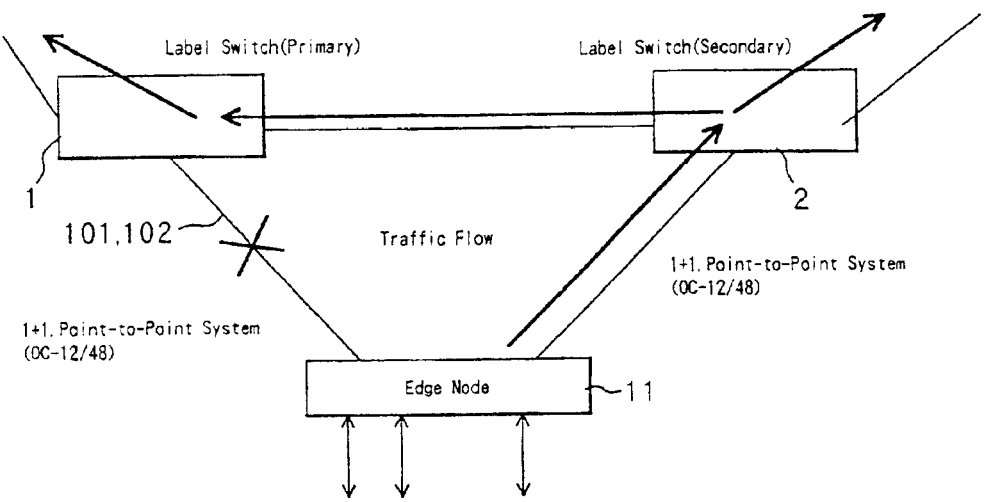
FIG. 5 is a diagram for explaining traffic when communication failure between the edge node shown in FIG. 1 and a primary switch occurs.
Figure 6:
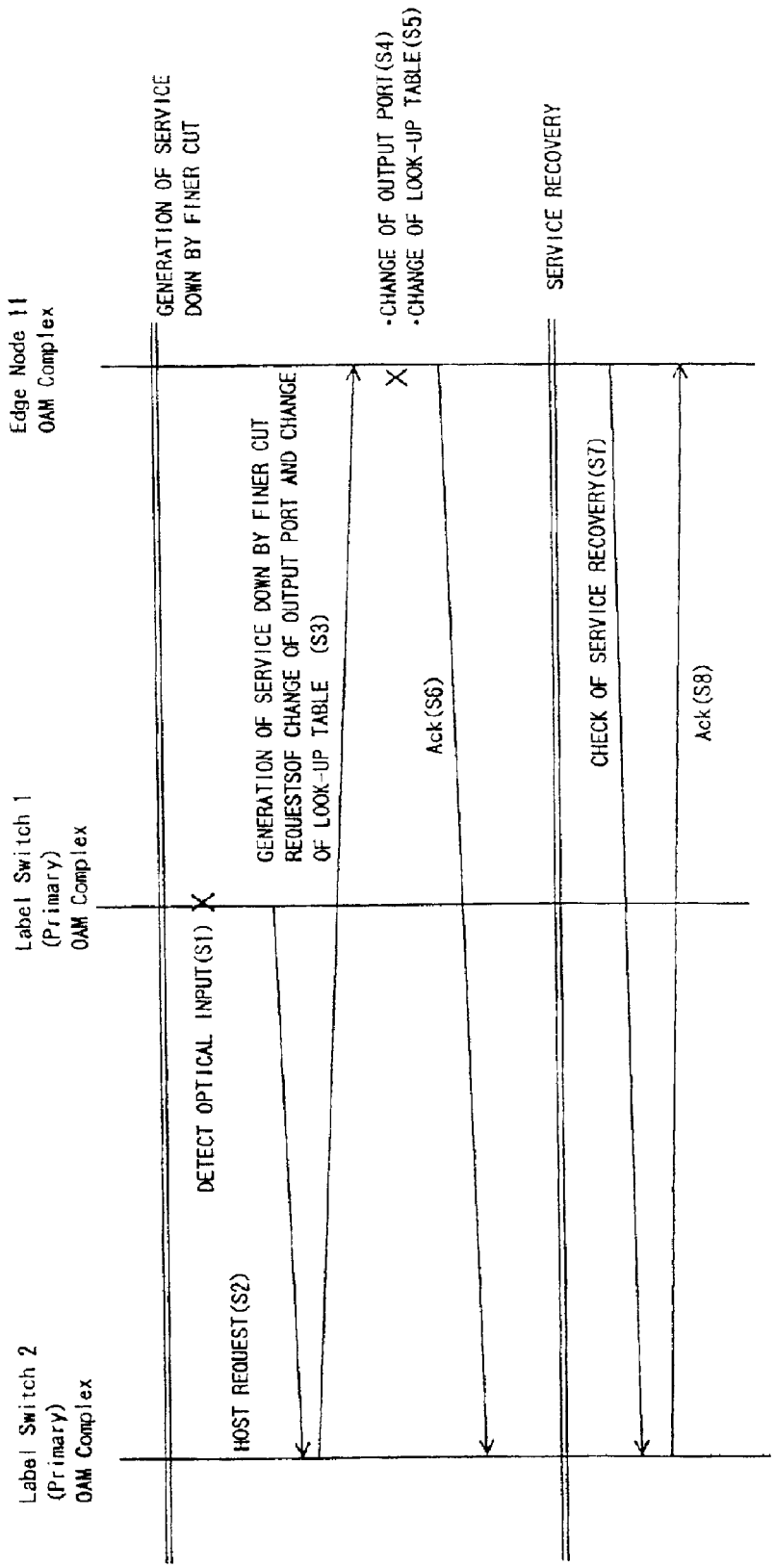
FIG. 6 is a sequence chart showing an operation in a core network shown in FIG. 1.

FIG. 4 is a diagram showing traffic when communication between the edge node 11 and the primary switch (label switch 1) is normal. FIG. 5 is a diagram showing traffic when a failure occurs in communication between the label switch 1 and the primary switch (label switch 1). FIG. 6 is a sequence chart showing an operation of the core network CN when a failure occurs when data transmission is performed in an upward direction (edge node 11→label switch 1).

In FIG. 6, when the communication between the edge node 11 and the label switch 1 is normal, when data is transmitted along the upward direction, the data is transmitted through the traffic shown in FIG. 4. Here, for example, as shown in FIG. 5, when the optical fibers 101 and 102 are disconnected from each other, the edge node 11 is disconnected from the core network CN.

At this time, the controller 62 (see FIG. 3) of the label switch 1 monitors the interfaces 41 to 44 to detect disconnection between the optical fibers 101 and 102 (failure of SONET circuit) (step S1). In this case, the controller 62 generates a message (host request message) for requesting the label switch 2 to operate as a high-order node (host) of the label switch 1, and transmits the message to the label switch 2 (step S2).

When the label switch 2 receives the host request message from the label switch 1, the following operation in the label switch 2. More specifically, the controller 62 of the label switch 2 shown in FIG. 3 receives the host request message. Thereafter, the controller 62 recognizes the edge node 11 as a low-order node of the label switch 2. The controller 62 sets the mode setting section 61 of the STMTSI unit 45 in a primary mode. Subsequently, the controller 62 gives the host request message to the LDP processor (master) 51.

The LDP processor 51 receives the host request message, the LDP processor 51 performs a label information generation process. More specifically, the LDP processor 51 notifies the configuration manager 52 of the host request message. The configuration manager 52 notifies the OSPF processor 53 that a failure occurs in a circuit for connecting the label switch 1 and the edge node 11 to each other.

At this time, the OSPF processor 53 notifies the other label switches 1, 3, and 4 that a failure occurs in an SONET circuit for connecting the label switch 1 and the edge node 11 to each other, and exchanges boundary node information with the other label switches according to OSPF protocol, so as to generate routing information (to be referred to as "updated routing information") that the label switch 1 does not serve as a source node or a destination node.

Thereafter, the OSPF processor 53 generates label information (to be referred to as "updated label information") corresponding to the generated updated routing information, and updates the look-up table 54a and the routing table 54b on the basis of the updated routing information and the updated label information. Subsequently, the OSPF processor 53 gives the updated contents (updated routing information and updated label information) of the tables 54a and 54b to the configuration manager 52.

The configuration manager 52 gives the updated routing information and the updated label information received from the OSPF processor 53 to the LDP processor 51. The LDP processor 51 inputs the updated routing information and the updated label information to the SAR/ATR 50. The SAR/ATR 50 inputs the updated routing information and the updated label information to the cell switch 46.

Thereafter, the updated routing information and the updated label information pass through the cell switch 46 and the STM-TSI unit 45, are input to the interfaces 43 and 44 together with an output port change request generated by the controller 62 and a change request of the look-up table 37, and are transmitted to the edge node 11 (step S3).

When the change request of the output port and the change request of the look-up table 37 are received by the edge node 11 (see FIG. 2), the following operation is performed in the edge node 11. More specifically, the controller 31 of the edge node 11 receives the change request of the output port. At this time, the controller 31 performs a predetermined signaling procedure between the label switch 2 and the edge node 11. In this manner, an SONET circuit (logical connection) is set on the optical fibers 103 and 104 for connecting the label switch 2 to the edge node 11. Subsequently, the controller 31 gives a switching control instruction to the STMTSI 23. The STMTSI 23 switches the output port of data from the interfaces 27 and 28 to the interfaces 29 and 30 (step S4).

Subsequently, the controller 31 receives the change request of the look-up table 37. At this time, the controller 31 gives the change request of the look-up table 37, the updated routing information, and the updated label information to the LDP processor 36 of each of the DIUs 21.

Each of the LDP processors 36 updates the look-up table 37 on the basis of the updated routing information and the updated label information (step S5). In this manner, the edge node 11 can transmit a cell to the label switch 2. Thereafter, a message ACK serving as an acknowledge message to the label switch 2 (step S6).

Since the OSPF processor 53 of the label switch 2 notifies the label switches 1, 3, and 4 of a failure in the SONET circuit between the label switch 1 and the edge node 11, the OSPF processors 53 of the label switches 1, 3, and 4 generate routing information (updated routing information) that the label switch 1 does not serve as a source node or a destination node according to OSPF.

Thereafter, the label switches 1, 3, and 4 generate label information (updated label information) corresponding to the updated routing information, and the updated routing information and the updated label information are given to edge nodes whose order nodes are lower than those of the label switches 3 and 4. Each of the edge nodes updates the look-up table 37 on the basis of the updated routing information and the updated label information. In this manner, the edge node 11 can communicate with another edge node through the label switch 2. More specifically, a service for transmitting data from the edge node 11 to another edge node is recovered.

At this time, the controller 31 of the edge node 11 gives an acknowledge message that the service is recovered to the label switch 2 (step S7). When the controller 62 of the label switch 2 receives the acknowledge message that the service is received, the controller 62 gives a message ACK corresponding to the acknowledge message that the service is recovered to the edge node 11 (step S8).

Thereafter, transmission of data from the edge node 11 to the label switch 2 is started, for example, and data transmitted from the edge node 11 is transmitted between label switches through the traffic shown in FIG. 5. In this manner, the edge node is prevented from being disconnected from the core network CN by a failure caused by a label switch whose order is higher than that of the edge node. The operation described above is performed when each of the label switches 2 to 4 detects a failure in the SONET circuit for connecting the label switch to an edge node whose order is lower than that of the label switch.

Figure 7:
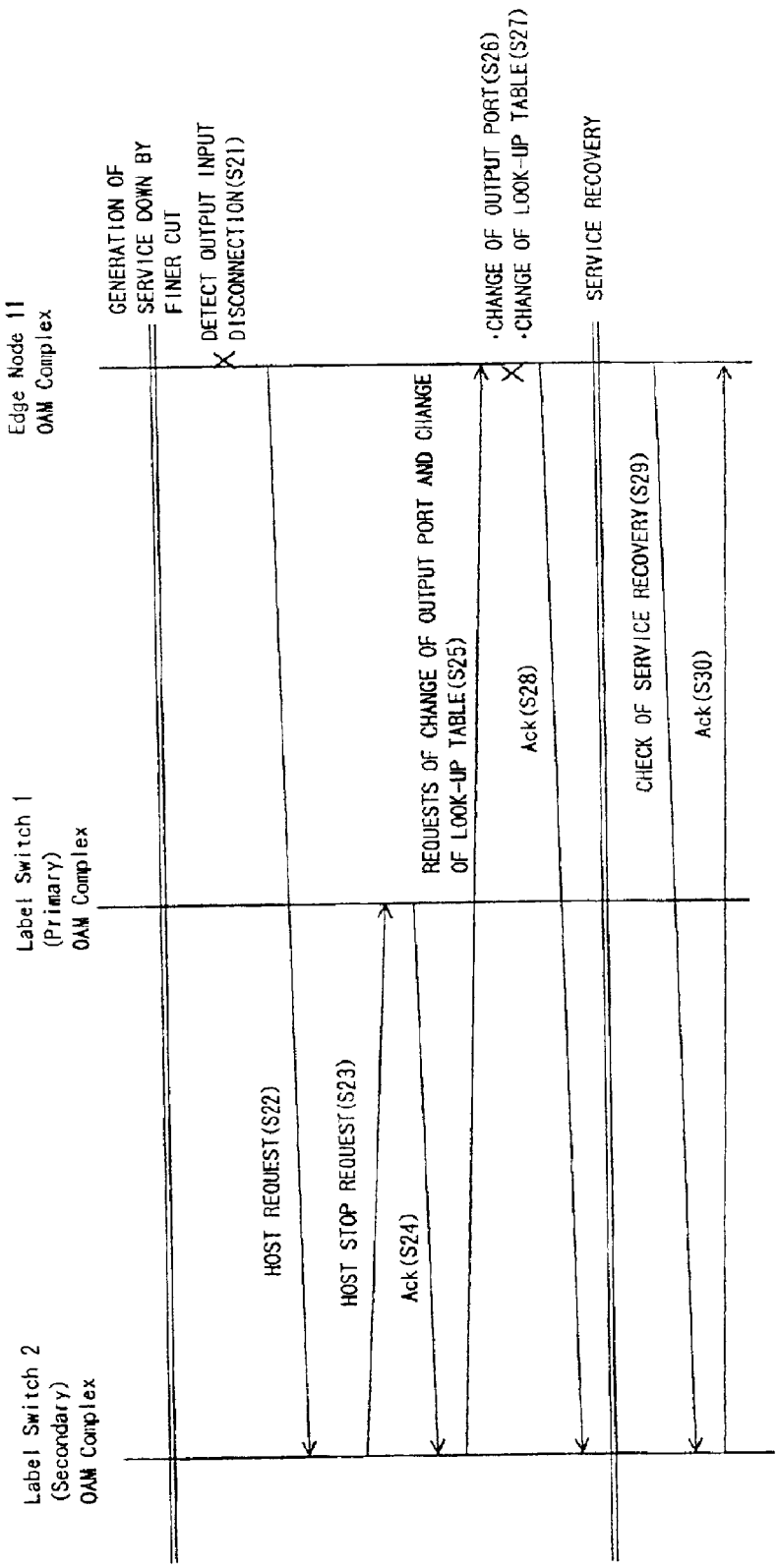
FIG. 7 is a sequence chart showing an operation in a core network shown in FIG. 1.

FIG. 7 is a sequence chart showing an operation of the core network CN when a failure occurs when data is transmitted along the downward direction (label switch 1→edge node 11).

In FIG. 7, when communication between the edge node 11 and the label switch 1 (in normal state), the edge node 11 receives data from the label switch 1. At this time, in the edge node 11, the communication between the edge node 11 and the label switch 1 is monitored by the controller 31 or the monitor section 35 (see FIG. 2) in an STM layer, an ATM layer, and an IP layer.

Here, for example, when the optical fibers 101 and 102 are disconnected, in the edge node 11, failures of the circuits in the layers are detected. More specifically, the controller 31 detects a failure of the STM layer (SONET circuit) (detects optical input disconnection) (step S21), and the monitor section 35 detects a failure of each of the circuits of the ATM layer and the IP layer. At this time, the monitor section 35 gives a failure occurrence notice to the controller 31.

When the controller 31 receives the failure occurrence notice, the controller 31 generates a host request message serving as a message for requesting the label switch 2 serving as a secondary switch that the label switch 2 operates as a host, and transmitted to the host request message to the label switch 2 (step S22).

When the label switch 2 (see FIG. 3) receives the host request message, the controller 62 of the label switch 2 transmits a host stop request message serving as a message for requesting the edge node 11 that the operation of the edge node 11 serving as a host is stopped to the label switch 1 (step S23).

When the label switch 1 receives the host stop request message, the controller 62 of the label switch 1 stops the operation of the edge node 11 serving as a host, and transmits a message ACK serving as an acknowledge message of the host stop request to the label switch 2 (step S24).

When the label switch 2 receives the message ACK, the same operation as that performed in step S2 shown in FIG. 6 and subsequent steps is performed between the label switch 2 and the edge node 11 (steps S25 to S30). In this manner, the high-order switch of the edge node is switched from the primary switch to the secondary switch, and the edge node 11 can receive data from the label switch 2. Therefore, the edge node 11 is prevented from being disconnected from the core network CN.

The operation described above is similarly performed when each of the edge nodes 12 to 18 detects a failure of communication between the edge node and the label switch set as the primary switch. The operation is performed when the SONET circuit for connecting the edge node to the primary switch is disconnected. However, the same operation as described above is performed when each of the monitor sections 35 detects a failure of a circuit in the ATM layer or the IP layer.

When the monitor section 35 detects a synchronous error to notify the controller 31 that the synchronous error occurs, the controller 31 performs only a process of canceling the synchronous error, and a switching operation from the primary switch to the secondary switch is not performed. This is because the synchronous error is not caused by disconnection of the optical fibers 101 and 102.

The controller 62 of each of the label switches 1 to 4 shown in FIG. 3 has a self-check function. The controller 62 monitors the operation of each of the components (STM-TSI unit 45, cell switch 46, STMTSI 47, and the like) of the label switch by the self-check function. When the controller 62 detects a failure of the operation of each component, the same operations as those in steps S2 to S8 shown in FIG. 6 are performed. In this manner, when a failure occurs in the label switch itself, an edge node whose order is lower than that of the label switch can be prevented from being disconnected from the core network CN.

The NMS 70 shown in FIG. 1 is connected to the controllers 62 of the label switches 1 to 4 through DCCs to perform the maintenance, operation, management, and the like of the label switches 1 to 4. For this reason, the NMS 70 monitors of the operations of the label switches 1 to 4. The NMS 70 exchanges operation monitoring messages with the label switches 1 to 4 through the DCCs, so that the label switches 1 to 4 are monitored. As the operation monitoring message, for example, a "polling" message defined by OSPF or BGP4 is used.

Figure 8:
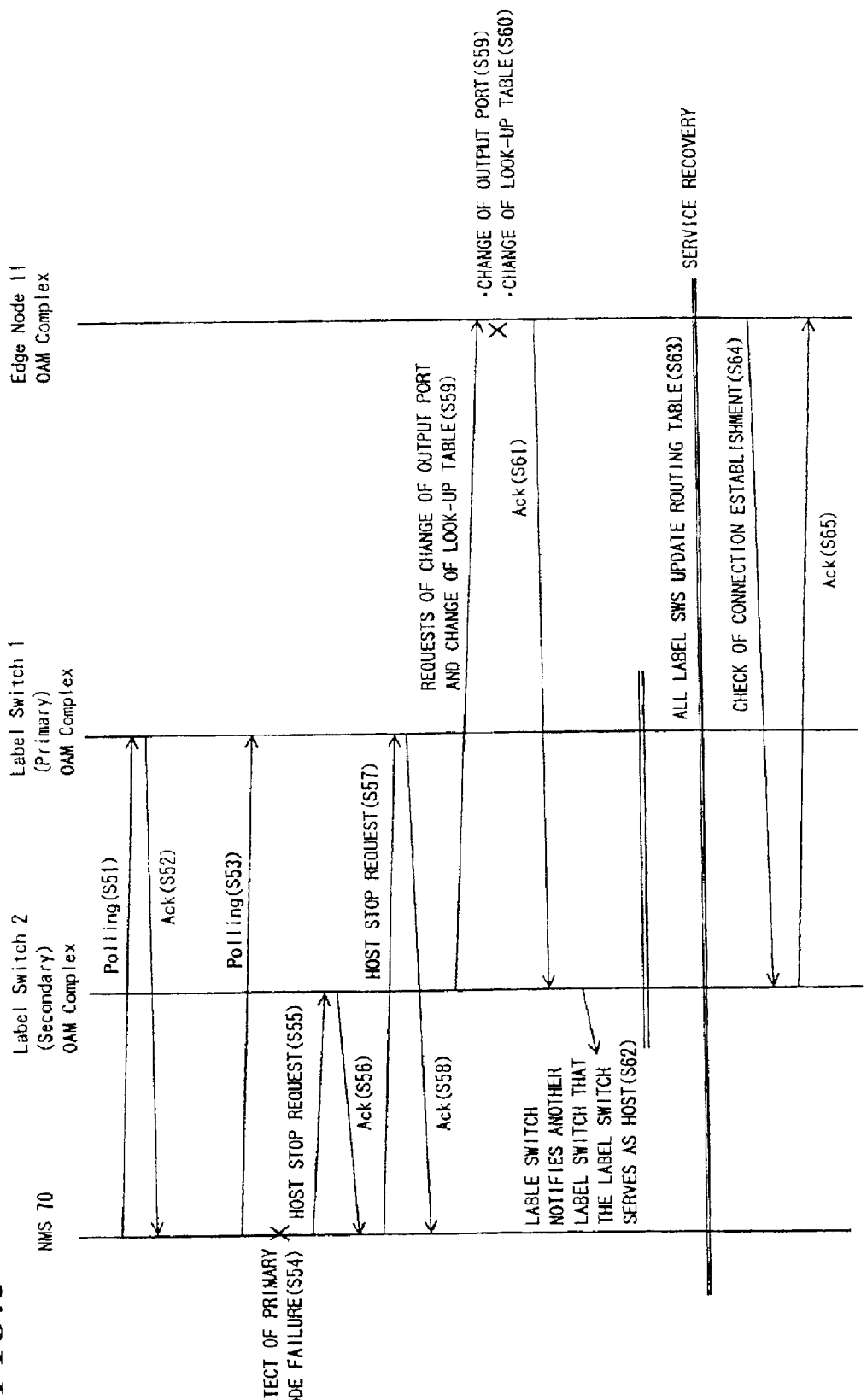
FIG. 8 is a sequence chart showing an operation in a core network shown in FIG. 1.

FIG. 8 is a sequence chart showing a monitoring operation for the label switch 1 performed by the NMS 70 and an operation performed when a failure of the label switch is detected by the NMS 70. FIG. 8 shows, as an example, the NMS 70 exchanges a polling message with the label switch 1. It is presumed that the label switch 1 normally operates as the primary switch of the edge node 11.

In FIG. 8, the NMS 70 transmits the polling message to the label switch 1 (step S51). When the controller 62 of the label switch 1 receives the polling message, the controller 62 transmits the reception acknowledge message ACK of the polling message to the NMS 70 (step S52). In this manner, the NMS 70 transmits the polling message to the label switch 1 to receive the ACK of the polling message, so that the NMS 70 monitors the normality of the label switch 1.

Thereafter, when the NMS 70 transmits the polling message (step S53), the label switch 1 runs away, the controller 62 of the label switch 1 does not transmit the reception acknowledge message ACK of the polling message to the NMS 70 (cannot transmit the reception acknowledge message ACK). For this reason, the NMS 70 cannot receive the message ACK from the label switch 1.

When a predetermined period of time has elapsed after the polling message is transmitted to the label switch 1, i.e., when a reception acceptance time of the message ACK is up, the detection section 71 of the NMS 70 determined that the label switch 1 has trouble, and detects a failure of the primary node (step S54).

When the failure of the primary node is detected, the host change request section 72 of the NMS 70 transmits a host request message for requesting the edge node 11 that the edge node 11 serves as a host to the label switch 2 serving as the secondary switch of the edge node 11 (step S55). When the controller 62 of the label switch 2 receives the host request message, the controller 62 transmits the reception acknowledge message ACK of the host request message to the NMS 70 (step S56).

When the NMS 70 receives the message ACK from the label switch 2, the NMS 70 transmits a host stop request message for requesting the edge node 11 that the edge node 11 serving as a host to the label switch 1 (step S57).

When the controller 62 of the label switch 1 receives the host stop request message from the NMS 70, if the controller 62 can recognize the host stop request message, the controller 62 transmits an acknowledge message ACK of the host stop request message to the NMS 70 (step S58). The controller 62 of the label switch 1 stops the operation of the edge node 11 serving as a host. However, when the label switch 1 runs away, the label switch 1 cannot perform an operation depending on the host stop request message in many cases. In this case, the operations in steps S59 shown in FIG. 8 and the subsequent steps are performed.

More specifically, the controller 62 of the label switch 2 performs the same operations in step S2 shown in FIG. 6 and the subsequent steps between the controller 62 and the edge node 11 (steps S59 to S61). At this time, the label switch 2 notifies the other label switches 3 and 4 that the label switch 2 becomes the host (primary switch) of the label switch 1 (step S62).

In this manner, the label switches 3 and 4 exchange and acquire routing information which does not include the label switch 1 as updated routing information between the label switches 3 and 4 and the other label switch, and generate updated label information based on the updated routing information, so that the look-up table 54a and the routing table 54b are updated on the basis of the updated routing information and the updated label information (step S63).

Subsequently, each of the label switches 3 and 4 gives the updated routing information and the updated label information to an edge node whose order lower than that of the corresponding label switch. The low-order edge node updates the look-up table 37 on the basis of the updated routing information and the updated label information. In this manner, a state wherein data transmission can be performed between the label switch 2 and the edge node 11 is established, i.e., the service is recovered.

Thereafter, the edge node 11 transmits an acknowledge message for establishing a logical connection (SONET circuit) for connecting the edge node 11 to the label switch 2 (connection establishment acknowledge message) to the label switch 2 (step S64). When the label switch 2 receives the connection establishment acknowledge message, the label switch 2 transmits the acknowledge message ACK corresponding to the connection establishment acknowledge to the edge node 11 (step S65).

Thereafter, when the edge node 11 receives the acknowledge message ACK from the label switch 2, communication (data transmission/reception) is performed between the label switch 2 and the edge node 11. For this reason, the edge node 11 can be prevented from being omitted from the core network by runaway of the label switch 1.

Operation of Embodiment 1

According to the network system of Embodiment 1, when a failure occurs in an optical fiber for connecting the primary switch to the edge node whose order is lower than that of the primary switch, or a failure occurs in the primary switch itself, the label switch whose order is higher than that of the edge node is switched from the primary switch to the secondary switch.

For this reason, the edge node is prevented from being omitted from the core network CN, and the edge node can be prevented from communicating with another edge node. Therefore, the reliability of the network systemusing the core network CN can be improved.

A failure of the optical fiber for connecting the label switch to the edge node can be detected by both the edge node and the label switch, and a switching operation from the primary switch to the secondary switch can be started from both the edge node side and the label switch side. For this reason, the network system can cope with a circuit failure in the upward direction of data and a circuit failure in the downward direction of data.

Since the controller 62 of each of the label switches 1 to 4 has a self-check function, a switching operation from the primary switch to the secondary switch can be performed when a failure occurs in a cell exchange in each of the label switches 1 to 4.

Since the NMS 70 whose order is higher than that of each of the label switches 1 to 4 monitors the operation of each of the label switches 1 to 4, even if trouble of the label switch causes, a switching operation from the primary switch to the secondary switch can be performed.

In Embodiment 1, each of the label switches 1 to 4 serves as the secondary switch of the edge node whose order is lower than that of another label switch. In this manner, when each of the label switches 1 to 4 serves as the backup switch of another label switch, even if a failure occurs in the label switch itself, a data transmission service using the core network CN can be provided.

In Embodiment 1, when the label switch is switched from the primary switch to the secondary switch, the edge node receives updated routing information and updated label information, and the look-up table 37 is updated on the basis of the updated routing information and the updated label information. In place of this, the updated routing information and the updated label information used when the label switch is switched from the primary switch to the secondary switch are held by each edge node in advance. When a failure of an optical fiber or a label switch itself is detected, each edge node may update the look-up table 37 on the basis of the updated routing information and the updated label information which are held in advance.

In Embodiment 1, the NMS 70 has a configuration for monitoring the operations of the label switches 1 to 4. In place of this, NMSS may be arranged for label switches, respectively.

The configuration according to the present invention can be applied as a configuration in which when a load on the primary switch is higher than a predetermined value, part of the traffic of the primary switch is caused to temporarily flow to the secondary switch.

[Embodiment 2]

Figure 9:
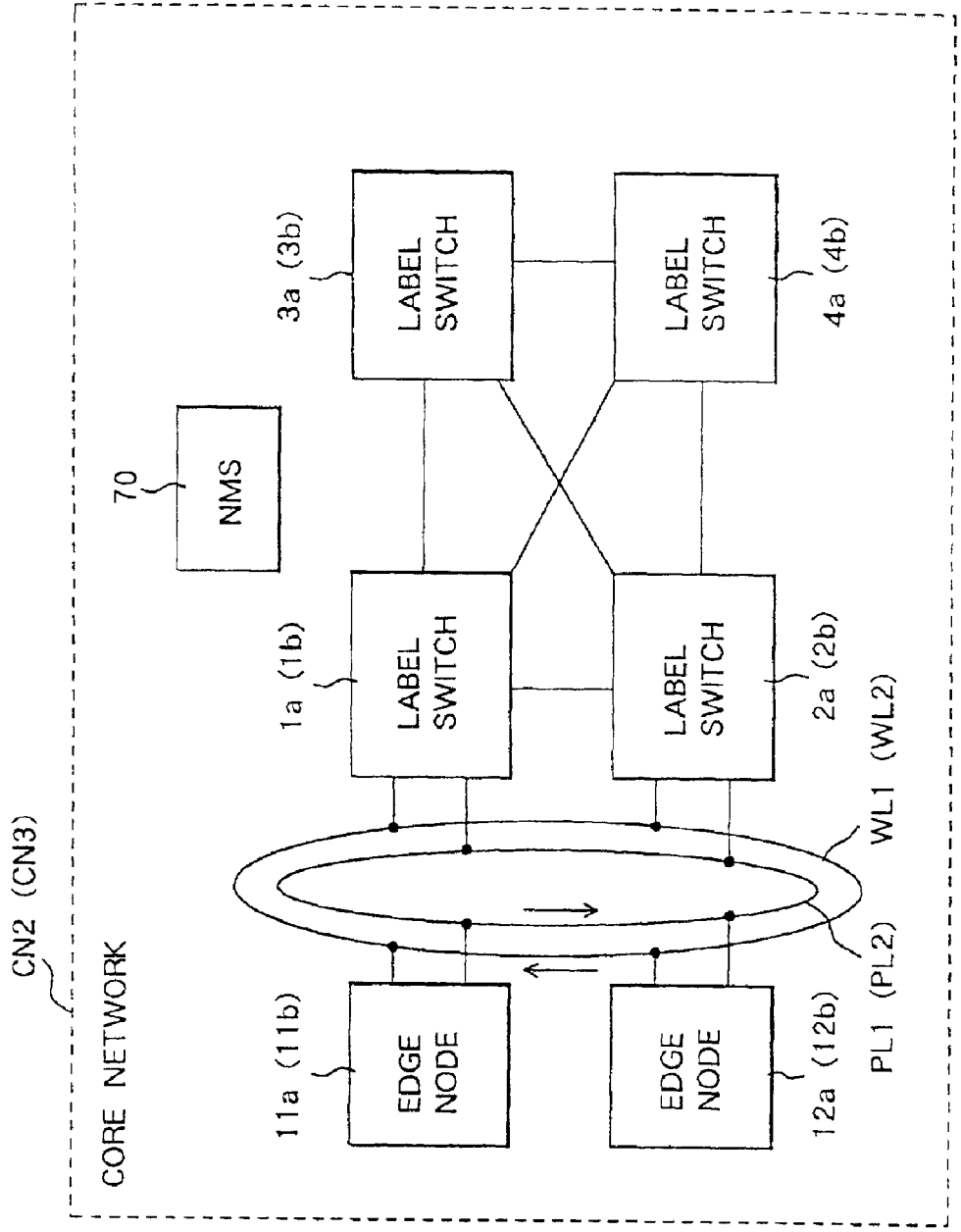
FIG. 9 is a diagram of the configuration of a network system according to Embodiment 2.

Embodiment 2 of a network system according to the present invention will be described below. Since Embodiment 2 and Embodiment 1 include points in common, a description of the common points is omitted, and different points will be described below. FIG. 9 is a diagram showing the configuration of a core network CN2 according to Embodiment 2.

In FIG. 9, label switches 1a to 4a corresponding to the label switches 1 to 4 shown in FIG. 1 and edge nodes 11a and 12a corresponding to the edge nodes 11 and 12 are shown. Since the configuration corresponding to the edge nodes 13 to 18 and the configuration of the low-order node network of the core network CN are almost the same as those in Embodiment 1 shown in FIG. 1, a description thereof will be omitted.

In FIG. 9, the edge nodes 11a and 12a are connected to high-order label switches 1a and 2a through a UPSR (Unidirectional Path Switched Ring), respectively. More specifically, the label switches 1a and 2a and the edge nodes 11a and 12a are connected in the form of a ring through a working line WL1 and a protection line PL1. The lines WL1 and PL1 are constituted by optical fibers. For example, four channels (first channel to fourth channel) are arranged on each of the lines WL1 and PL1. The working line WL1 transmits data in the clockwise direction, and the protection line PL1 transmits data in the counterclockwise direction.

In Embodiment 2, the label switch 1a is set as the primary switch of the edge node 11a, and the label switch 2a is set as the secondary switch of the edge node 11a. The label switch 2a is set as the primary switch of the edge node 12a, and the label switch 1a is set as the secondary switch of the edge node 12a.

The first to fourth channels of each of the lines WL1 and PL1 are allocated to predetermined label switch and edge nodes according to the setting. For example, the first channels of the lines WL1 and PL1 are allocated to communication with the label switch 1a and the edge node 11a to constitute an SONET circuit for performing communication between the label switch 1a and the edge node 11a. The second channels of the lines WL1 and PL1 are allocated to data transmission/reception to/from the label switch 2a and the edge node 11a to constitute an SONET circuit for performing data transmission/reception between the label switch 2a and the edge node 11a. The third channels of the lines WL1 and PL1 are allocated to communication with the label switch 1a and the edge node 12a, and the fourth channels of the lines WL1 and PL1 are allocated to communication with the label switch 1a and the edge node 12a.

Figure 10:
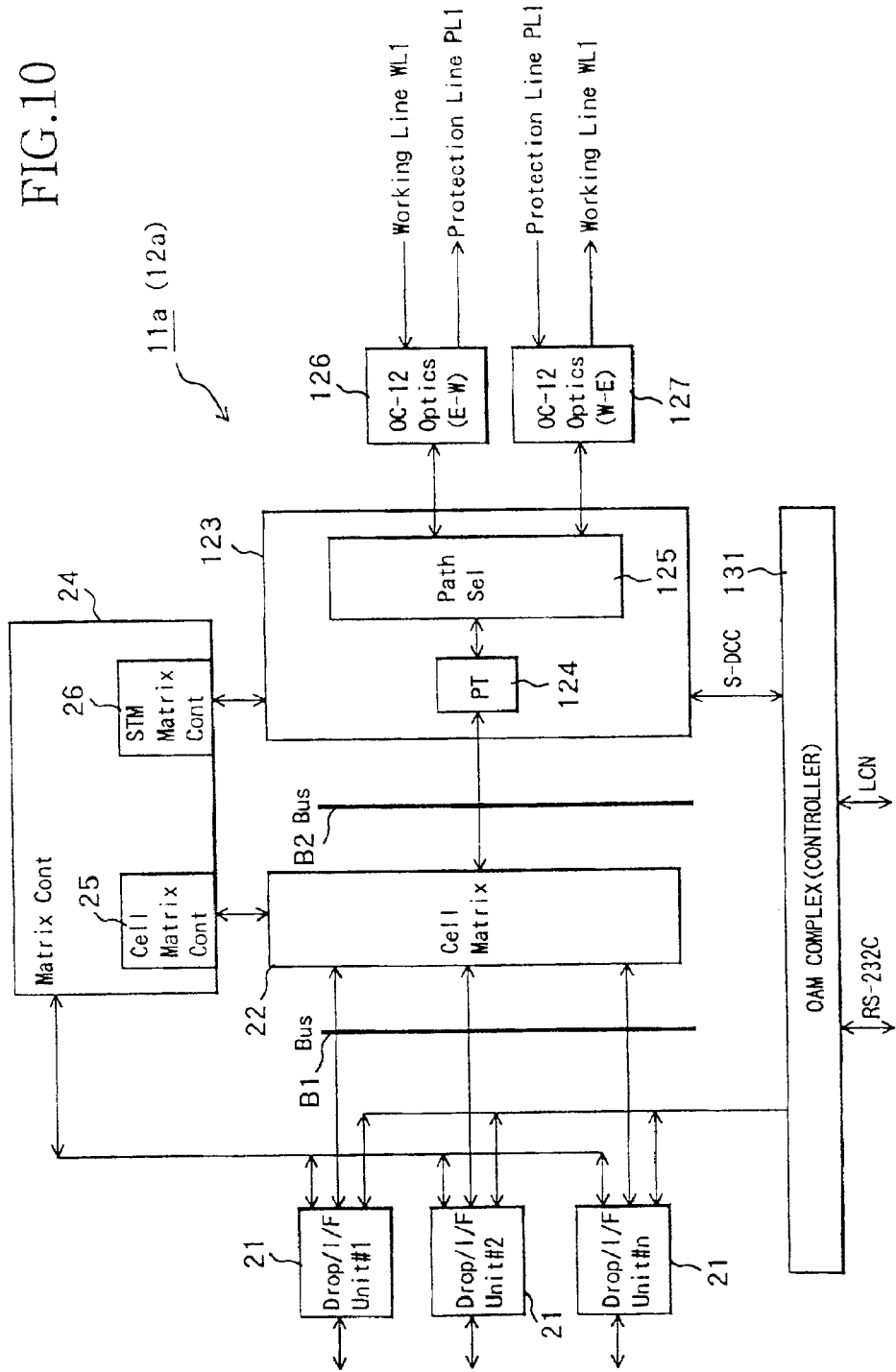
FIG. 10 is a diagram of the configuration of an edge node shown in FIG. 9.

FIG. 10 is a diagram showing the configuration of each of the edge nodes 11a and 12a shown in FIG. 9. Since the edge nodes 11a and 12a have the identical configurations, the edge node 11a will be described below as an example. As shown in FIG. 10, the edge node 11a has a configuration identical to that of the edge node 11 shown in FIG. 2 except for an STMTSI 123, interfaces 126 and 127, and a controller 131.

Each of the interfaces 126 accommodates the lines WL1 and PL1 shown in FIG. 9. The STMTSI 123 has a path termination (PT) 124 and a path selector 125. The PT 124 is connected to the cell matrix 22 through the bus B2. The path selector 125 is connected to the PT 124 and connected to the interfaces 126 and 127 and the controller 131.

When the PT 124 receives a plurality of cells from the cell matrix 22, the PT 124 maps the plurality of cells on a predetermined SONET frame to give the SONET frame to the path selector 125. On the other hand, when the PT 124 receives the SONET frame from the path selector 125, and the PT 124 extracts a plurality of cells from the SONET frame to give the cells to a cell matrix 22.

The path selector 125 selects the channels (first and second channels) in each of the lines WL1 and PL1 according to a control instruction from the controller 131, and the path selector 125 gives an SONET frame from the selected channels to give the SONET frame to the PT 124. On the other hand, when the path selector 125 receives the SONET frame from the PT 124, the path selector 125 transmits the SONET frame to the selected channels.

Therefore, data transmitted through a channel to which the edge node 11 is not allocated is transmitted to a boundary node on the downstream side of the edge node 11 through the edge node 11. For example, when data transmitted through the third and fourth channels of the working line WL1 is input to the interface 126, the data is transmitted from the interface 127 through the path selector 125 of the STMTSI 123.

Figure 11:
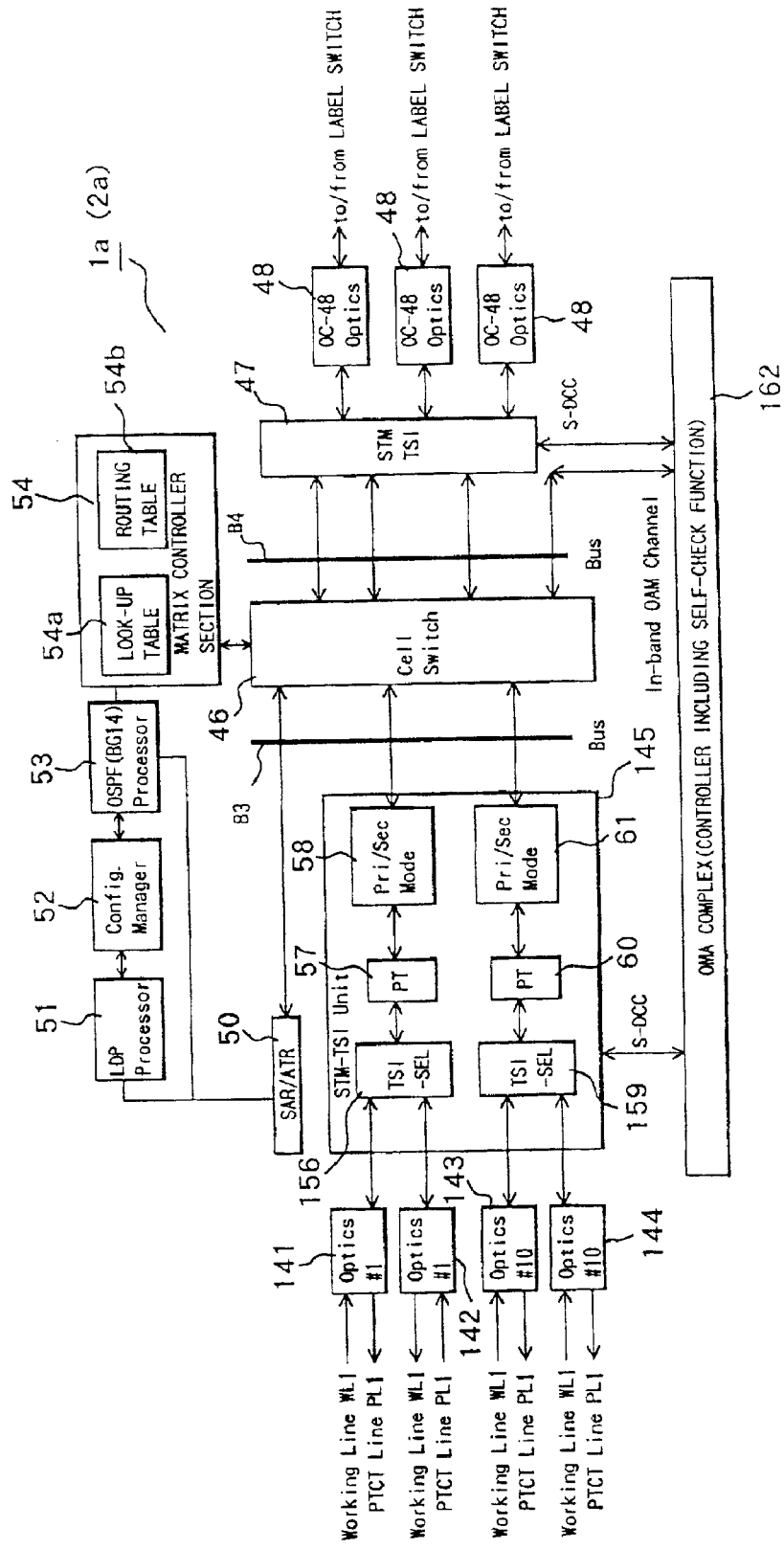
FIG. 11 is a diagram of the configuration of a label switch shown in FIG. 9.

FIG. 11 is a diagram showing the configuration of each of the label switches 1a and 2a shown in FIG. 9. Since the label switches 1a and 2a have the identical configurations, the label switch 1a will be described below as an example. As shown in FIG. 11, the label switch 1a has a configuration identical to that of the label switch 1 shown in FIG. 3 except for the interfaces 141 to 144. Each of the interfaces 141 to 144 accommodates the working line WL1 and the protection line PL1 shown in FIG. 9.

A TSI selector 156 of an STMTSI unit 145 acquires the first channel and/or the second channel in each of the lines WL1 and PL1 according to a control instruction from a controller 162. On the other hand, a TSI selector 159 acquires the third channel and/or the fourth channel in each of the lines WL1 and PL1 according to a control instruction from the controller 162.

Figure 12:
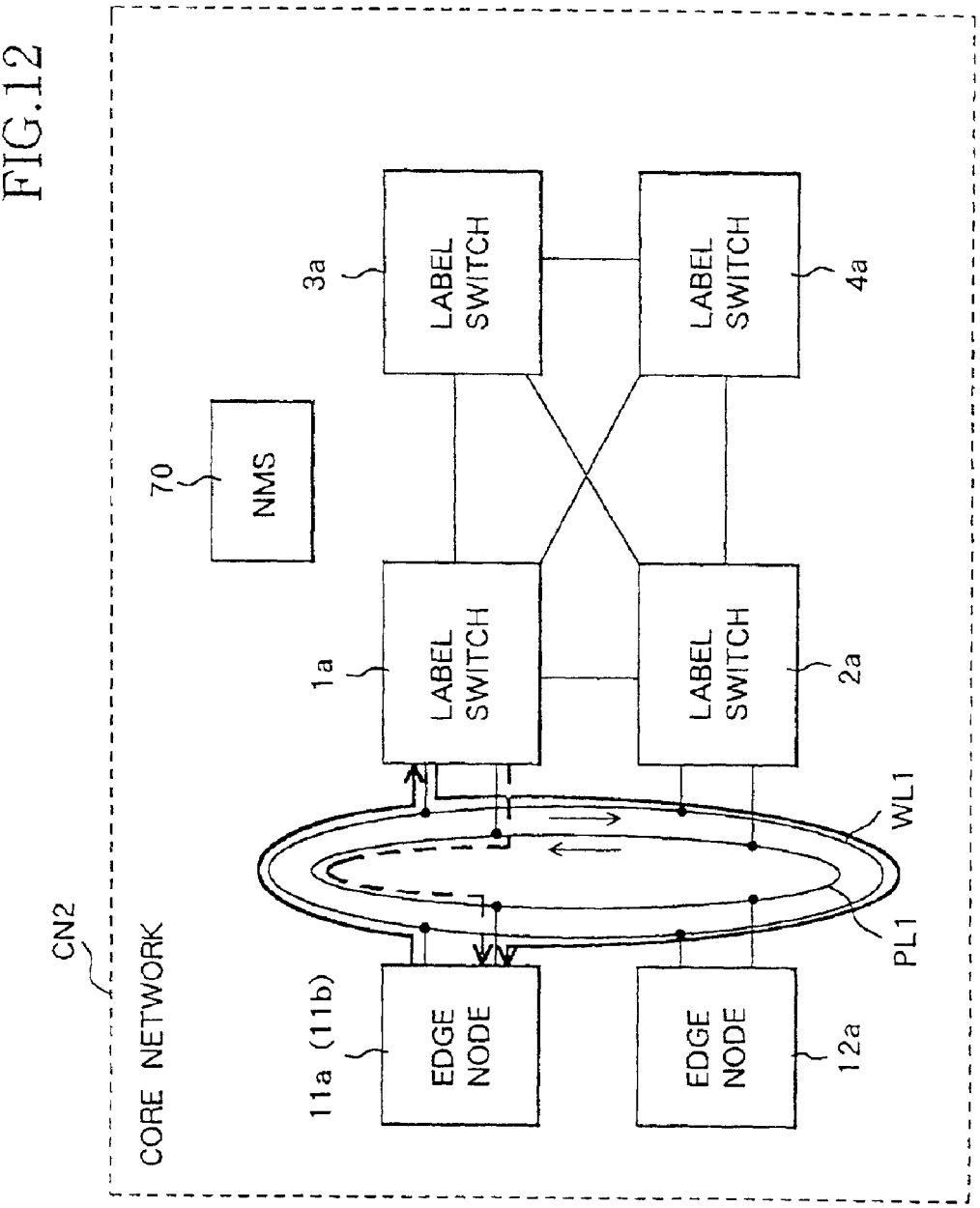
FIG. 12 is a diagram of traffic between the edge node shown in FIG. 9 and a primary switch.

FIG. 12 is a diagram for explaining traffic of the label switch 1a and the edge node 11a shown in FIG. 10. As shown in FIG. 12, in a normal state, when data is transmitted from the edge node 11a to the label switch 1a, the data is transmitted to the label switch 1a through the first channel of the working line WL1 as indicated by an arrow represented by a solid line in FIG. 12. On the other hand, when data is transmitted from the label switch 1a to the edge node 11a, the data is transmitted to the edge node 11a through the first channel of the working line WL1 as indicated by an arrow represented by a solid line in FIG. 12.

In contrast to this, when the lines WL1 and PL1 are disconnected, the traffic is changed as follows. More specifically, as shown in FIG. 12, the lines WL1 and PL1 for connecting the edge node 11a and the edge node 12a are disconnected, the edge node 11 cannot receive data from the label switch 1a through the fist channel of the working line WL1.

At this time, the controller 131 of the edge node 11a detects a failure (failure of SONET circuit) of the working line WL1. At this time, the controller 131 gives a control instruction to the path selector 125 of the STMTSI 123. In this case, the path selector 125 switches a channel for receiving data transmitted from the label switch 1a from the first channel of the working line WL1 to the first channel of the protection line PL1.

Thereafter, the controller 131 notifies the label switch 1a that the channel for receiving data is the first channel of the protection line PL1 through the working line WL1. The controller 162 of the label switch 1a receives the notice from the controller 131 the controller 162 gives a control instruction to the TSI selector 156 of the STMTSI unit 145. At this time, the TSI selector 156 switches a channel for transmitting data to the edge node 11a from the first channel of the working line WL1 to the first channel of the protection line.

In this manner, as indicated by an arrow represented by a broken line in FIG. 12, the edge node 11a comes to receive the data from the label switch 1a through the first channel of the protection line PL1.

Figure 13:
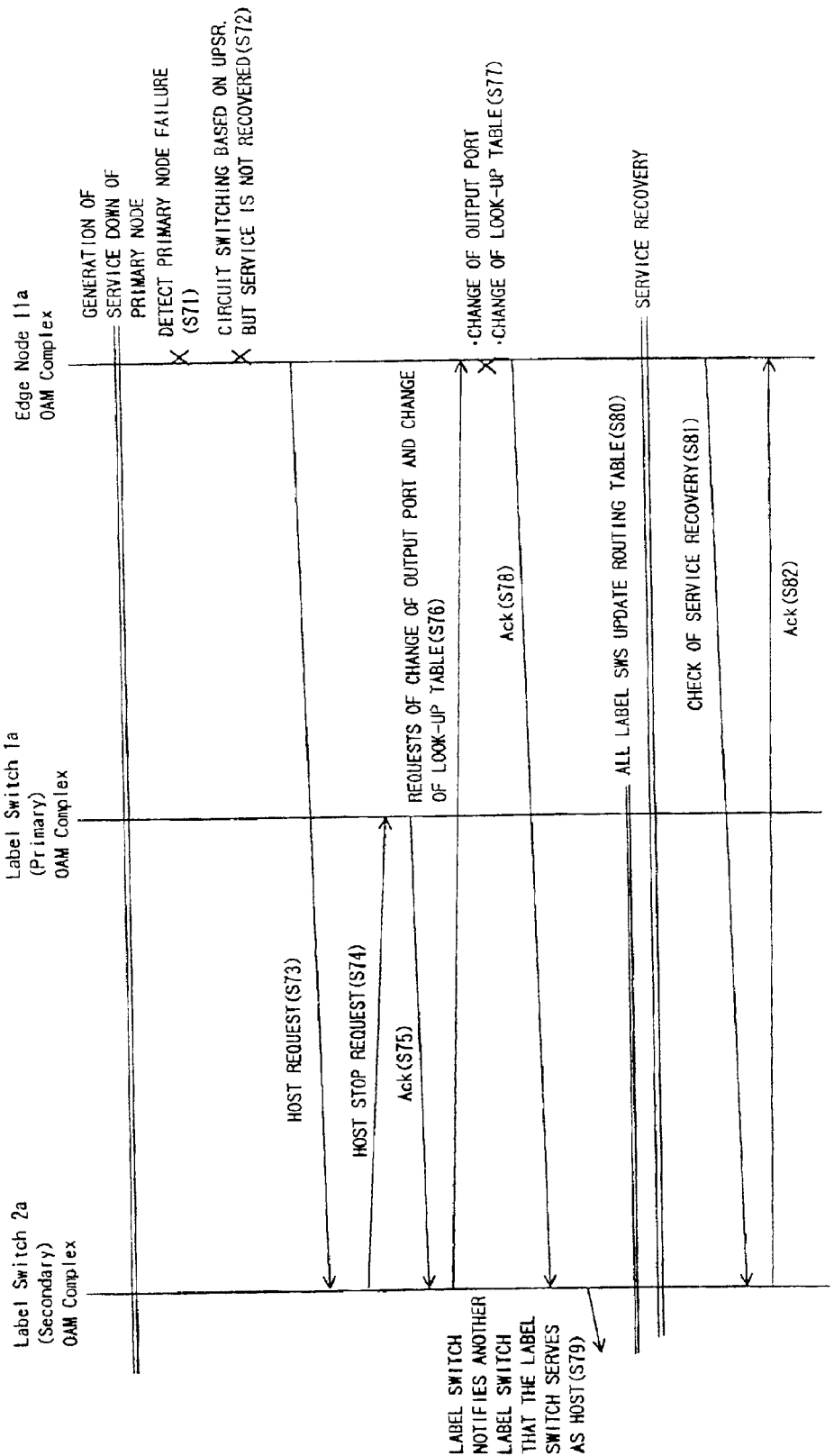
FIG. 13 is a sequence chart showing an operation in the core network shown in FIG. 9.
Figure 14:
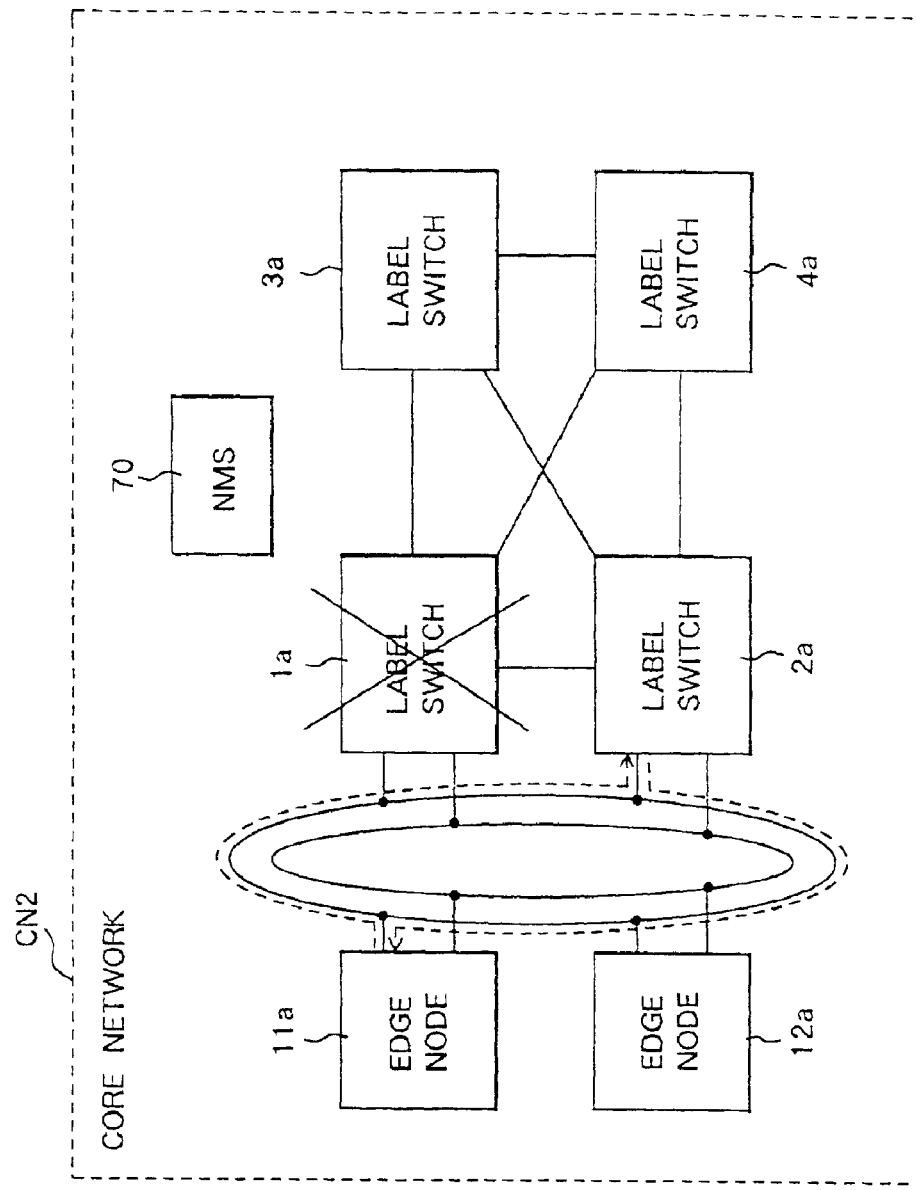
FIG. 14 is a diagram for explaining traffic between the edge node shown in FIG. 9 and a secondary switch.

FIG. 13 is a sequence chart showing an operation of a network system when the edge node 11a detects a failure (Primary Node Failure) of the label switch 1a, and FIG. 14 is a chart showing traffic obtained after the operation shown in FIG. 13.

For example, in the core network CN2 shown in FIG. 12, it is assumed that a failure occurs in the first channel of the working line WL1 and that the edge node 11a cannot receive data from the label switch 1a.

In this case, as shown in FIG. 13, the controller 131 (see FIG. 10) of the edge node 11a detects a circuit failure of the STM layer as a failure of the label switch 1a (step S71). At this time, the controller 131 performs circuit switching control based on UPSR (step S72). More specifically, the controller 131 performs the operation described above to set a channel for receiving data from the label switch 1a to be the first channel of the protection line PL1.

Thereafter, when the edge node 11a cannot receive data from the label switch 1a through the first channel of the protection line PL1, the controller 131 of the edge node 11a connects the edge node 11a and the label switch 2a (secondary switch) to each other through the second channels of the lines WL1 and PL1, and transmits the host request message described in Embodiment 1 to the label switch 2a (step S28).

When the label switch 2a receives the host request message, the controller 162 of the label switch 2a transmits the host stop request message described in Embodiment 1 to the label switch 1a (step S74). At this time, when the controller 162 of the label switch 1a can respond to the host stop request message, an acknowledge message ACK corresponding to the host stop request message is transmitted from the label switch 1a to the label switch 2a (step S75).

When a predetermined period of time has elapsed after the controller 162 of the label switch 2a transmits the host stop request message, regardless of whether the label switch 2a receives a message ACK from the label switch 1a, the same operations as in steps S59 to S63 shown in FIG. 8 are performed (step S76 to S80). In this manner, the service of the edge node 1a is recovered. More specifically, the edge node 11 is set in such a state that the edge node 11 can communicate with another edge node through the label switch 2a.

Thereafter, the controller 131 of the edge node 11a transmits an acknowledge message that the service is recovered to the label switch 2a (step S81). When the controller 131 receives a message ACK corresponding to the acknowledge message (step S82), data transmission/reception is performed between the edge node 11a and the label switch 2a through the traffic shown in FIG. 14. At this time, as shown in FIG. 14, the edge node 11a and the label switch 2a perform data transmission/reception through the second channel of the line WL1.

When a failure occurs in the label switch 1a itself, and a failure of an SONET circuit caused by this failure is detected by the controller 131 of the edge node 11a, the same operations as those shown in FIG. 13 are performed in the core network CN2. When a failure occurs in the label switch 1a itself, and the self-check function of the controller 162 of the label switch 1a detects the failure in the label switch 1a itself, the same operations as those shown in FIG. 6 are performed in the core network CN2. In addition, trouble of the label switch 1a is detected by the NMS 70 (see FIG. 9), the same operations as those shown in FIG. 8 are performed in the core network CN. In this manner, the edge node 11a is prevented from being omitted from the core network CN2.

When a failure occurs in communication between the edge node 12a and the label switch 2a, the high-order node of the edge node 12a is switched from the label switch 2a to the label switch 1a, and the edge node 12a is prevented from being omitted from the core network CN2.

[Embodiment 3]

Embodiment 3 of a network system according to the present invention will be described below. Since Embodiment 3 and Embodiment 2 include points in common, a description of the common points is omitted, and different points will be described below.

A core network CN3 according to Embodiment 3 has a configuration identical to that of the core network CN2 shown in FIG. 9. However, the core network CN3 is different from the core network CN2 in that label switches 1b and 2b and edge nodes 11b and 12b are connected to each other through a shared ring. More specifically, the label switches 1b and 2b and the edge nodes 11b and 12b are connected to each other through a working line WL2 and a protection line PL2. Unlike Embodiment 2, data transmitted from the edge nodes 11b and 12b and the label switches 1b and 2b are transmitted through the same path in the lines WL2 and PL2.

Figure 15:
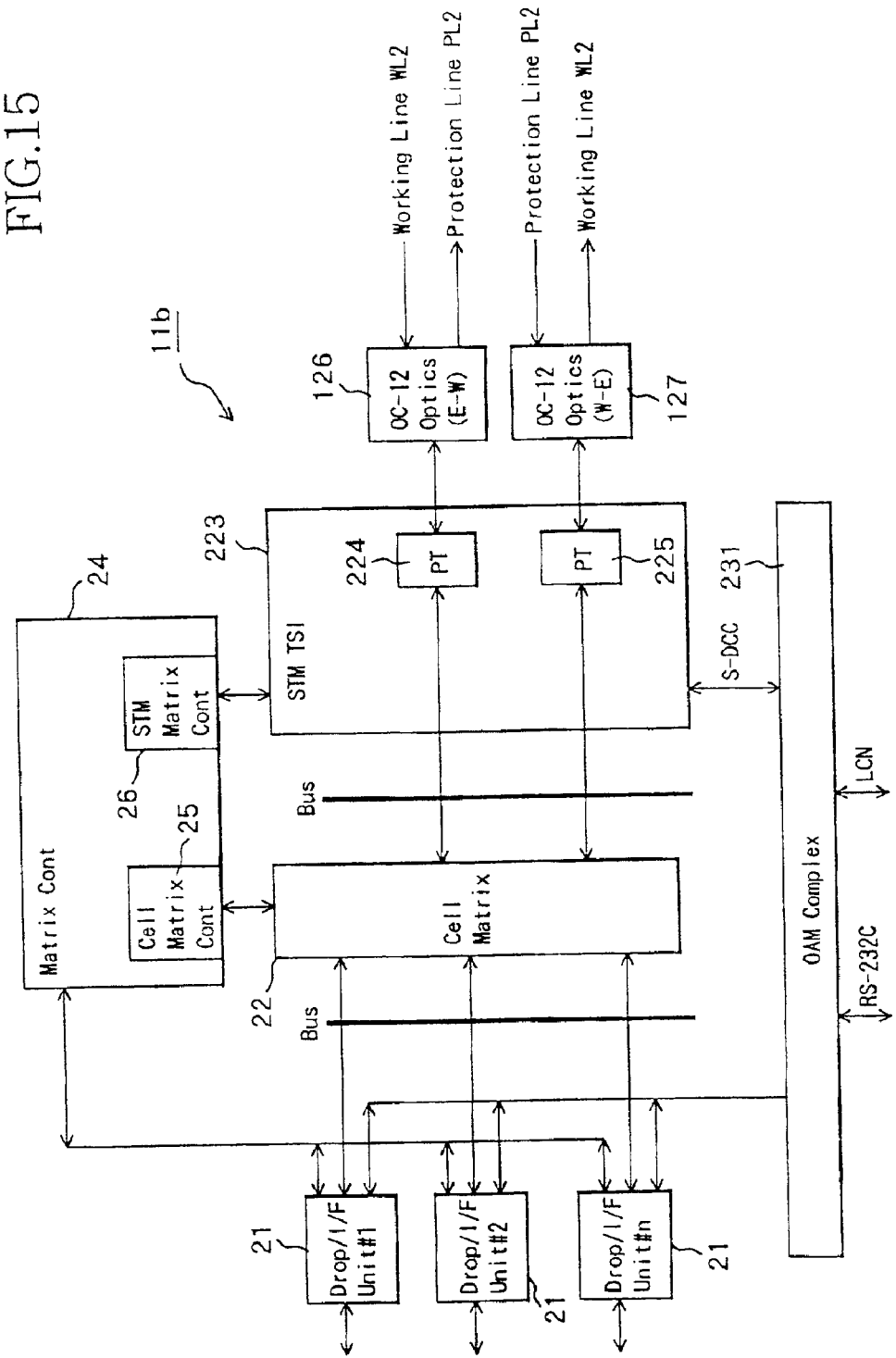
FIG. 15 is a diagram of the configuration of an edge node according to Embodiment 3.

FIG. 15 is a diagram showing the configuration of the edge nodes 11b and 12b according to Embodiment 3. Since the edge nodes 11b and 12b have the identical configurations, the edge node 11b will be described below as an example. As shown in FIG. 15, the edge node 11a has a configuration almost identical to that of the edge node 11a shown in FIG. 10 except for an STMTSI 223 and a controller 231.

The STMTSI 123 has a PT 224 and a PT 225. The PT 224 is connected to a cell matrix 22 and an interface 126, and the PT 225 is connected to the cell matrix 22 and an interface 127. Each of the PTs 224 and 225 generate/separate SONET frames.

More specifically, when the PT 224 receives a SONET frame from the interface 126, the PT 224 extracts a plurality of cells from the SONET frame to give the cells to the cell matrix 22. The cell matrix 22 transmits the cells from an appropriate output-path according to labels added to the cells.

At this time, when the cells should be received by the edge node 11, the cell matrix 22 transmits the cells to one of DIUs 21. In contrast to this, when the cells should be received by another edge node, the cell matrix 22 transmits the cells to the PT 225. The PT 225 maps the cells on an SONET frame. The SONET frame transmits to the working line WL2 through the interface 127.

The operation described above is similarly performed when the PT 225 receives the SONET frame from the interface 127. In this manner, the edge node 11b drops only a cell which should be received by the edge node 11b itself in a downstream direction, and returns the other cells to an original line (line WL2 or line PL2).

Figure 16:
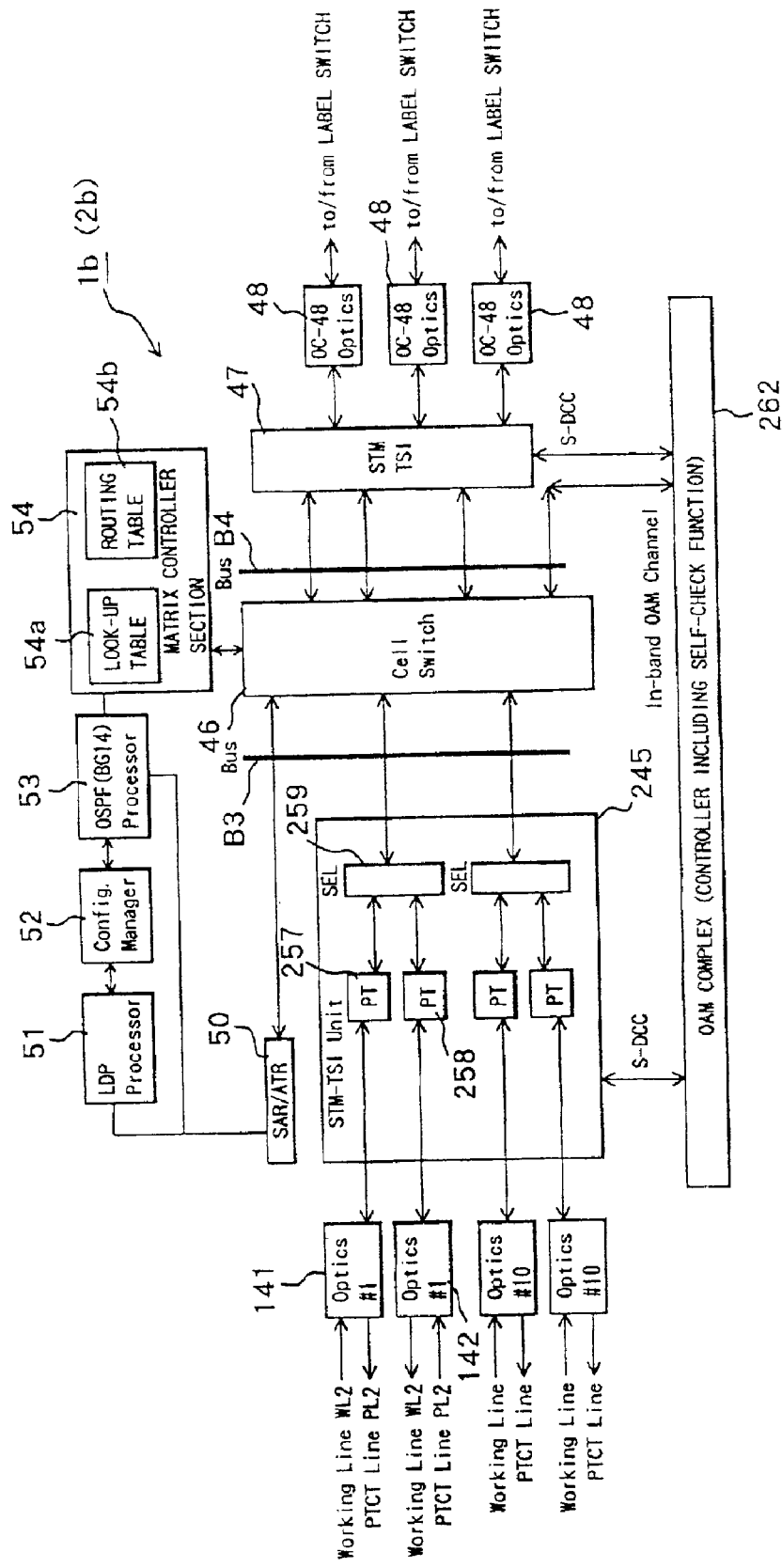
FIG. 16 is a diagram of the configuration of a label switch in Embodiment 3.
Figure 17:
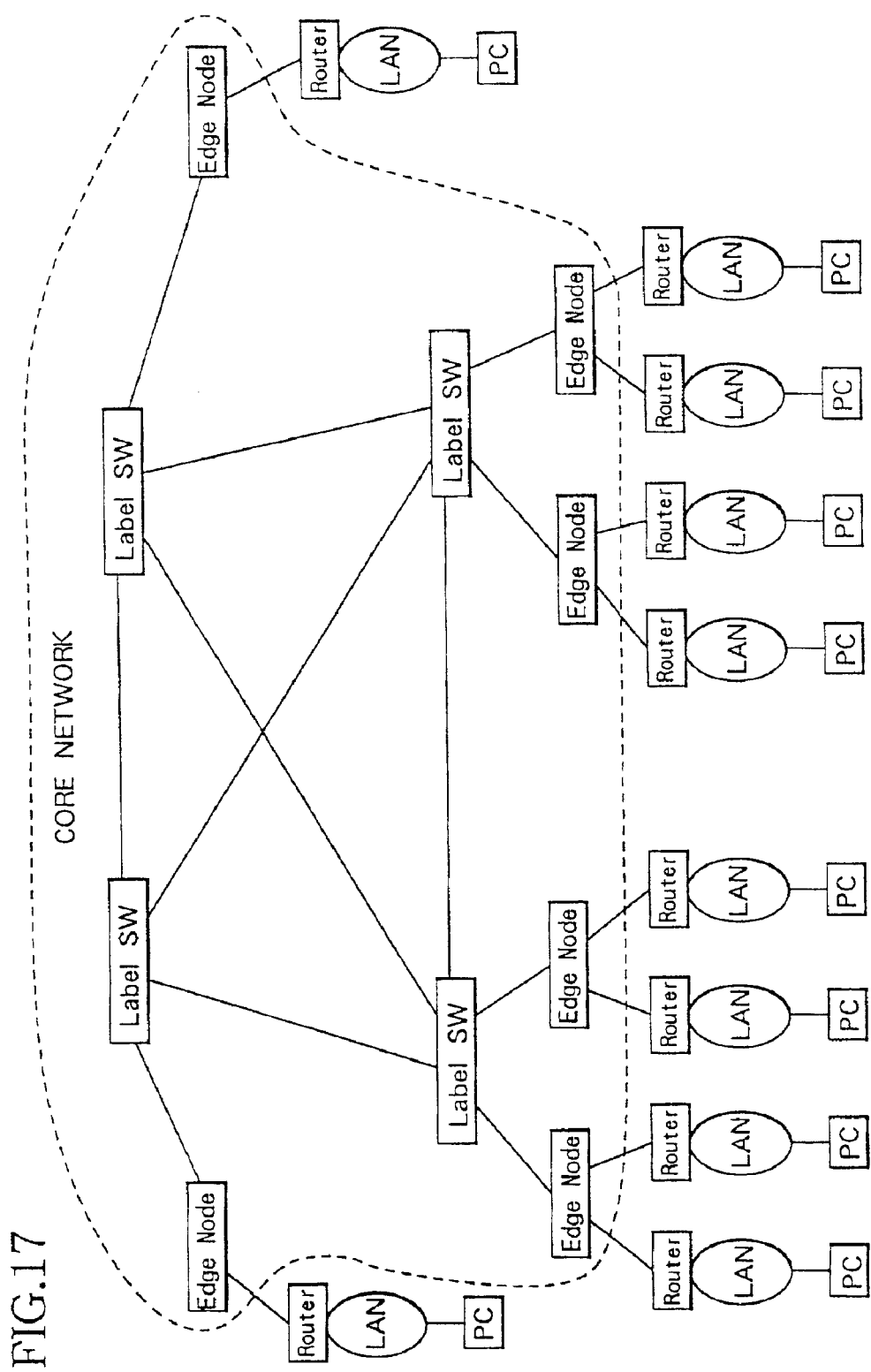
FIG. 17 is a diagram of a network system using a label switching system.

FIG. 16 is a diagram showing the configuration of the label switches 1b and 2b according to Embodiment 3. Since the label switches 1b and 2b have the identical configurations, the label switch 1a will be described below as an example. As shown in FIG. 16, the label switch 1a has a configuration almost identical to that of the label switch 1 shown in FIG. 3 except for an STMTSI unit 245. Each of the interfaces 141 and 142 accommodates the working line WL2 and the protection line PL2 shown in FIG. 9.

The STMTSI unit 245 has PTs 257 and 258 and a selector 259. The PT 257 is connected to the interface 141 and the selector 259. The PT 258 is connected to the interface 142 and the selector 259. The selector 259 is connected to a cell switch 46 through a bus B3.

When an SONET frame transmitted through the working line WL2 is received by the interface 141, the interface 141 gives the SONET frame to the PT 257. The PT 257 extracts a plurality of cells from the SONET frame to give the cells to the selector 259. The selector 259 gives the cells to the cell switch 46. The cell switch 46 transmits the cells from an appropriate output-path according to labels added to the cells.

At this time, when the cells should be received by the label switch 1b, the cell switch 46 transmits the cells to the STMTSI 47. In contrast to this, when the cells should be received by the label switch 2b, the cell switch 46 transmits the cells to the selector 259. When the cells received from the cell switch 46 should be transmitted to the working line WL2, the selector 259 gives the cells to the PT 258. In contrast to this, when the cells received from the cell switch 46 should be transmitted to the protection line PL2, the selector 259 gives the cells to the PT 257. Here, the cells are given to the PT 258.

The PT 258 maps the cells received from the selector 259 on the SONET frame to give the SONET frame to the interface 142. The interface 142 outputs the SONET frame to the working line WL2. The same operation as described above is performed when the SONET frame transmitted through the protection line PL2 is received by the interface 142. In this manner, the label switch 1b transmits only a cell which should be received by the label switch 1b itself to the STMTSI 47, and returns the cell which should be received by the label switch 2b to an original line (line WL2 or line PL2).

Since the operation and effect of the core network CN according to Embodiment 3 are almost the same as those in Embodiment 2, a description thereof will be omitted.

In each of Embodiments 1 to 3, label switches are constituted by ATM switching systems. However, the label switches may be constituted by routers so that an IP packet to which labels is added are transmitted between the label switches.

What is claimed is:

1. A network system comprising a high-order node network performing label switching, which includes a plurality of high-order nodes and a plurality of low-order nodes, each of the low-order nodes is connected to one of the plurality of high-order nodes and transfers data to another low-order node through the high-order node network, the network system comprising:

first and second high-order nodes, each of which is provided on the high-order node network as one of the plurality of high-order nodes; and a first low-order node is provided on the high-order node network as one of the plurality of low-order nodes, wherein the first low-order node is connected to the first and second high-order nodes via at least one physical line, wherein the first low-order node comprising:
 a first output port to transmit data to the first high-order node via said at least one physical line;
 a second output port to transmit data to the second high-order node via said at least one physical line;
 a selecting section to select one of the first and second output ports in order that the first low-order node transmits data to one of the first and second high-order nodes;
 a detection section detecting, in the case of the first output port is selected by the selecting section, a communication failure between the first low-order node and the first high-order node;
 a host change request section making a request to the second high-order node that the second high-order node serves as a high-order node for the first low-order node in place of the first high-order node when the detection section detects the communication failure; and
 a low-order node setting section performing processes for causing the first low-order node to transmit data to the second high-order node in place of the first high-order node on the basis of process information transmitted from the second high-order node, wherein the selecting section selects the second output port as one of the processes, wherein the second high-order node comprising:
 a high-order node setting section performing at least one process for causing the second high-order node to transmit data received from the first low-order node to another low-order node corresponding to a destination of the data according to the request of the host change request section; and
 a process information transmission section transmitting the process information corresponding to the process performed by the high-order node setting section to the first low-order node.

2. A network system comprising a high-order node network performing label switching, which includes a plurality of high-order nodes and a plurality of low-order nodes, each of the low-order nodes is connected to one of the plurality of high-order nodes and transfers data to another low-order node through the high-order node network, the network system comprising:

first and second high-order nodes, each of which is provided on the high-order node network as one of the plurality of high-order nodes; and a first low-order node is provided on the high-order node network as one of the plurality of low-order nodes, wherein the first low-order node is connected to the first and second high-order nodes via at least one physical line and includes a first output port to transmit data to the first high-order node via said at least one physical line, a second output port to transmit data to the second high-order node via said at least one physical line, and a selecting section to select one of the first and second output ports in order that the first low-order node transmits data to one of the first and second high-order nodes, wherein the first high-order node comprising:
 a detection section detecting, in the case of when the first output port is selected by the selecting section, a communication failure between the first high-order node and the first low-order node; and
 a host change request section making a request to the second high-order node that the second high-order node serves as a high-order node for the first low-order node in place of the first high-order node when the detection section detects the communication failure, wherein the second high-order node comprising:
 a high-order node setting section performing at least one process for causing the second high-order node to transmit data received from the first low-order node to another low-order node corresponding to a destination of the data according to the request of the host change request section; and
 a process information transmission section transmitting process information corresponding to the process performed by the high-order node setting section to the first low-order node, wherein the first low-order node comprising:
 a low-order node setting section performing at least one process for causing the first low-order node to transmit data to the second high-order node in place of the first high-order node on the basis of the process information transmitted from the process information transmission section, wherein the selecting section selects the second output port based on the process information.

3. A network system comprising a high-order node network performing label switching, which includes a plurality of high-order nodes and a plurality of low-order nodes, each of the low-order nodes is connected to one of the plurality of high-order nodes and transfers data to another low-order node through the high-order node network, the network system comprising:

first and second high-order nodes, each of which is provided on the high-order node network as one of the plurality of high-order nodes;

a first low-order nodes is provided on the high-order node network as one of the plurality of low-order nodes, wherein the first low-order node is connected to the first and second high-order nodes via at least one physical line, and includes a first output port to transmit data to the first high-order node via said at least one physical line, a second output port to transmit data to the second high-order node via said at least one physical line, and a selecting section to select one of the first and second output ports in order that the first low-order node transmits data to one of the first and second high-order nodes; and a high-order computer for monitoring at least the first high-order node, wherein the high-order computer comprising:
  a detection section detecting, in the case of when the first output port is selected by the selecting section, a failure of the first high-order node; and
  a host change request section making a request to the second high-order node that the second high-order node serves as a high-order node for the first low-order node in place of the first high-order node when the detection section detects the failure of the first high-order node,
wherein the second high-order node comprising:
  a high-order node setting section performing a process of causing the second high-order node to transmit data received from the first low-order node to another low-order node corresponding to a destination of the data according to the request of the host change request section; and
  a process information transmission section transmitting process information corresponding to the process performed by the high-order node setting section to the first low-order node,
wherein the first low-order node comprising:
  a low-order node setting section for performing at least one process for causing the first low-order node to transmit data to the second high-order node in place of the first high-order node on the basis of the process information transmitted by the process information transmission section, wherein the selecting section selects the second output port based on the process information.

4. A network system according to the claim 1, wherein
each of the high-order nodes holds path information corresponding to a transmission route of data in the high-order node network,
each of the low-order nodes receives the path information from a high-order node corresponding to the low-order node itself and, when data is transferred to the high-order node, adds path information corresponding to a destination of the data to the data,
each of the high-order nodes transmits the data transferred from a low-order node to another low-order node according to the path information added to the data, the first low-order node further comprises:
  a memory section storing path information added to data when the data is transmitted to the high-order nodes; and
  an updating section for receiving updated path information transmitted from the second high-order node to update the memory section on the basis of the updated path information,
  the high-order node setting section of the second high-order node generates updated path information as new path information corresponding to a transfer route using the second high-order node as a source node in the high-order node network according to a request of the host change request section, and
  the process information transfer section of the second high-order node transmits the updated path information formed by the high-order node setting section to the first low-order node.

5. A network system according to the claim 2, wherein
each of the high-order nodes holds path information corresponding to a transfer route of data in the high-order node network,
each of the low-order nodes receives the path information from a high-order node corresponding to the low-order node itself and, when data is transmitted to the high-order node, adds path information corresponding to a destination of the data to the data,
each of the high-order nodes transmits the data transmitted from a low-order node to another low-order node according to the path information added to the data,
the high-order node setting section of the second high-order node generates updated path information as new path information corresponding to a transfer route using the second high-order node as a source node in the high-order node network according to a request of the host change request section,
the process information transmission section of the second high-order node transmits the updated path information generated by the high-order node setting section to the first low-order node,
the first low-order node further comprises a memory section storing path information added to data when the data is transmitted to the high-order nodes, and
the low-order node setting section of the first low-order node receives the updated path information transmitted from the second high-order node to update the storage section on the basis of the updated path information.

6. A network system according to the claim 2, wherein
each of the high-order nodes holds path information corresponding to a transfer route of data in the high-order node network,
each of the low-order nodes receives the path information from a high-order node corresponding to the low-order node itself and, when data is transmitted to the high-order node, adds path information corresponding to a destination of the data to the data,
each of the high-order nodes transmits the data transmitted from a low-order node to another low-order node according to the path information added to the data,
the detection section of the first high-order node detects a failure of the first high-order node itself,
the host change request section of the first high-order node requests the second high-order node that the second high-order node serves as the high-order node of the first low-order node in place of the first high-order node when the failure of the first high-order node itself is detected by the detection section,
the high-order node setting section of the second high-order node generates updated path information serving as new path information corresponding to a transfer route which uses the second high-order node as a source node in the high-order node network and does not comprise the first high-order node according to a request of the host change request section,
the process information transmission section of the second high-order node transmits the updated path information generated by the high-order node setting section to the first low-order node,
the first low-order node further comprises a memory section for storing path information added to data when the data is transmitted to the high-order nodes, and
the low-order node setting section of the first low-order node receives the updated path information transmitted from the second high-order node to update the storage section on the basis of the updated path information.

7. A network system according to the claim 3, wherein
each of the high-order nodes generates path information corresponding to a transfer route of data in the high-order node network, each of the low-order nodes receives the path information from a high-order node corresponding to the low-order node itself and, when data is transmitted to the high-order node, adds path information corresponding to a destination of the data to the data, each of the high-order nodes transmits data transmitted from a low-order node to another low-order node according to the path information added to the data, the high-order node setting section of the second high-order node generates updated path information serving as new path information corresponding to a transfer route which uses the second high-order node as a source node in the high-order node network and does not comprise the first high-order node according to a request of the host change request section, the process information transmission section of the second high-order node transmits the updated path information generated by the high-order node setting section to the first low-order node, the first low-order node further comprises a memory section for storing path information added to data when the data is transmitted to the high-order nodes, and the low-order node setting section of the first low-order node receives the updated path information transmitted from the second high-order node to update the storage section on the basis of the updated path information.

8. A service recovering method in a network system comprising a high-order node network constituted by a plurality of high-order nodes and a plurality of low-order nodes, each of the low-order nodes is connected to one of the plurality of high-order nodes, each of the high-order nodes having path information corresponding to transfer routes of data in the high-order node network, each of the low-order nodes receiving the path information from a high-order node corresponding to the low-order node itself and, when transmitting data to the high-order node, adding the path information corresponding to a destination of the data to the data, each of the high-order nodes transmitting data received from a low-order node toward another low-order node according to path information added to the data, the plurality of high-order nodes including a first and second high-order nodes, the plurality of low-order nodes including a first low-order node, the method comprising:

the first low-order node detecting a communication failure between the first high-order node and the first low-order node, wherein the first low-order node is connected to the first and second high-order nodes via at least one physical line, and includes a first output port to transmit data to the first high-order node via said at least one physical line, a second output port to transmit data to the second high-order node via said at least one physical line, and a selecting section to select one of the first and second output ports in order that the first low-order node transmits data to one of the first and second high-order nodes, and the first low-order node detects the communication failure when the first output port is selected by the selecting section;

the first low-order node requesting to the second high-order node that the second high-order node serves as a high-order node for the first low-order node in place of the first high-order node when the communication failure between the first low-order node and the first high-order node is detected;

the second high-order node recognizing the first low-order node as the low-order node of the second high-order node itself according to the request from the first low-order node and transmitting to the first low-order node, process information including updated path information serving as new path information corresponding to a transfer route passing through the second high-order node; and the first low-order node receiving the process information with updated path information transmitted from the second high-order node and updating contents of a memory section, which has stored path information to be added to data when the data is transmitted to the second high-order node, on the basis of the updated path information, wherein the selecting section selects the second output port based on the process information.

9. A service recovering method in a network system comprising a high-order node network constituted by a plurality of high-order nodes and a plurality of low-order nodes, each of the low-order nodes is connected to one of the plurality of high-order nodes, each of the high-order nodes having path information corresponding to transfer routes of data in the high-order node network, each of the low-order nodes receiving the path information from a high-order node corresponding to the low-order node itself and, when transmitting data to the high-order node, adding path information corresponding to a destination of the data to the data, each of the high-order nodes transmitting data received from a low-order node to another low-order node according to path information added to the data, the plurality of high-order nodes including first and second high-order nodes, the plurality of low-order nodes including a first low-order node, the method comprising:

the first high-order node detecting a communication failure between the first low-order node and the first high-order node, wherein the first low-order node is connected to the first and second high-order nodes via at least one physical line, and includes a first output port to transmit data to the first high-order node via said at least one physical line, a second output port to transmit data to the second high-order node via said at least one physical line, and a selecting section to select one of the first and second output ports in order that the first low-order node transmits data to one of the first and second high-order nodes, and the first high-order node detects the communication failure when the first output port is selected by the selecting section;

the first high-order node requesting to the second high-order node that the second high-order node serves as a high-order node for the first low-order node in place of the first high-order node when the communication failure between the first low-order node and the first high-order node is detected;

the second high-order node recognizing the first low-order node as the low-order node of the second high-order node itself according to the request from the first high-order node, and transmitting to the first low-order node, process information including updated path information serving as new path information corresponding to a transfer route passing through the second high-order node; and the first low-order node receiving the process information with the updated path information transmitted from the second high-order node and updating contents of a memory section, which has stored path information to be added to data when the data is transmitted to the second high-order node, on the basis of the updated path information, wherein the selecting section selects the second output port based on the process information.

10. A service recovering method in a network system comprising a high-order node network constituted by a plurality of high-order nodes and a plurality of low-order nodes, each of the low-order nodes is connected to one of the plurality of high-order nodes, each of the high-order nodes having path information corresponding to transfer routes of data in the high-order node network, each of the low-order nodes receiving the path information from a high-order node corresponding to the low-order node itself and, when transmitting data to the high-order node, adding path information corresponding to a destination of the data to the data, each of the high-order nodes transmitting data received from a low-order node to another low-order node according to path information added to the data, the plurality of high-order nodes including first and second high-order nodes, the plurality of low-order nodes including a first low-order node, the method comprising:

the first high-order node detecting a failure of the first high-order node itself, wherein the first low-order node is connected to the first and second high-order nodes via at least one physical line, and includes a first output port to transmit data to the first high-order node via said at least one physical line, a second output port to transmit data to the second high-order node via said at least one physical line, and a selecting section to select one of the first and second output ports in order that the first low-order node transmits data to one of the first and second high-order nodes, and the first high-order node detects the failure of the first high-order node itself when the first output port is selected by the selecting section;

the first high-order node requesting to the second high-order node that the second high-order node serves as the high-order node for the first low-order node in place of the first high-order node when a failure of the first high-order node itself is detected;

the second high-order node recognizing the first low-order node as the low-order node of the second high-order node according to the request of the first high-order node, and transmitting to the first low-order node, process information including updated path information serving as new path information corresponding to a transfer route passing through the second high-order node; and the first low-order node receiving the process information with the updated path information transmitted from the second high-order node and updating contents of a memory section, which has stored path information to be added to data when the data is transmitted to the second high-order node, on the basis of the updated path information, wherein the selecting section selects the second output port based on the process information.

11. A service recovering method in a network system comprising a high-order node network constituted by a plurality of high-order nodes and a plurality of low-order nodes, each of the low-order nodes is connected to one of the plurality of high-order nodes, and a high-order computer for managing the high-order node network, each of the high-order nodes generating path information corresponding to transfer routes of data in the high-order node network, each of the low-order nodes receiving the path information from a high-order node corresponding to the low-order node itself and, when transmitting data to the high-order node, adding path information corresponding to a destination of the data to the data, each of the high-order nodes transmitting data received from a low-order node to another low-order node according to path information added to the data, the plurality of high-order nodes including first and second high-order nodes, the plurality of low-order nodes including a first low-order node, the method comprising:

the high-order computer detecting a failure of the first high-order node, wherein the first low-order node is connected to the first and second high-order nodes via at least one physical line, and includes a first output port to transmit data to the first high-order node via said at least one physical line, a second output port to transmit data to the second high-order node via said at least one physical line, and a selecting section to select one of the first and second output ports in order that the first low-order node transmits data to one of the first and second high-order nodes, and the high-order computer detects the failure of the first high-order node when the first output port is selected by the selecting section;

the high-order computer requesting to the second high-order node that the second high-order node serves as a high-order node for the first low-order node in place of the first high-order node when the failure of the first high-order node is detected;

the second high-order node recognizing the first low-order node as a low-order node of the second high-order node itself according to the request of the high-order computer, and transmitting to the first low-order node, process information including updated path information serving as new path information corresponding to a transfer route passing throug the second high-order node; and the first low-order node receiving the process information with the updated path information transmitted from the second high-order node and updating contents of a memory section, which has stored path information to be added to data when the data is transmitted to the second high-order node, on the basis of the updated path information, wherein the selecting section selects the second output port based on the process information.

* * * * *